United States Patent
Parimi et al.

(10) Patent No.: US 10,454,935 B2
(45) Date of Patent: Oct. 22, 2019

(54) METHOD AND SYSTEM TO DETECT DISCREPANCY IN INFRASTRUCTURE SECURITY CONFIGURATIONS FROM TRANSLATED SECURITY BEST PRACTICE CONFIGURATIONS IN HETEROGENEOUS ENVIRONMENTS

(71) Applicant: CloudKnox Security Inc., Sunnyvale, CA (US)

(72) Inventors: Balaji Parimi, Sunnyvale, CA (US); Koteswara Rao Cherukuri, Los Altos Hills, CA (US)

(73) Assignee: CloudKnox Security Inc., Sunnyvale, CA (US)

( * ) Notice: Subject to any disclaimer, the term of this patent is extended or adjusted under 35 U.S.C. 154(b) by 142 days.

(21) Appl. No.: 15/481,499

(22) Filed: Apr. 7, 2017

(65) Prior Publication Data

US 2017/0295197 A1   Oct. 12, 2017

Related U.S. Application Data

(60) Provisional application No. 62/319,787, filed on Apr. 8, 2016.

(51) Int. Cl.
*H04L 29/06* (2006.01)
*G06N 20/00* (2019.01)
(Continued)

(52) U.S. Cl.
CPC .............. *H04L 63/10* (2013.01); *G06N 5/022* (2013.01); *G06N 20/00* (2019.01);
(Continued)

(58) Field of Classification Search
None
See application file for complete search history.

(56) References Cited

U.S. PATENT DOCUMENTS 8,091,117 B2 * 1/2012 Williams ............ H04L 41/0853
726/3
8,566,928 B2 * 10/2013 Dagon .............. H04L 29/12066
726/22

(Continued)

OTHER PUBLICATIONS

Mendes, Naaliel et al. Benchmarking the Security of Web Serving Systems Based on Known Vulnerabilities. 2011 5th Latin-American Symposium on Dependable Computing. https://ieeexplore.ieee.org/stamp/stamp.jsp?tp=&arnumber=5783404 (Year : 2011).*

(Continued)

*Primary Examiner* — Jeremiah L Avery
(74) *Attorney, Agent, or Firm* — Fenwick & West LLP

(57) ABSTRACT

A method, system and/or an apparatus to detect discrepancy in infrastructure security configurations from translated security best practice configurations in heterogeneous environments is disclosed. A method of an infrastructure security server communicatively coupled with a set of heterogeneous infrastructures translates a set of security best practice configurations of the heterogeneous infrastructures and/or a set of common vulnerabilities and exposures (CVE) of the heterogeneous infrastructures to programmatic execution. The method monitors the infrastructure security configurations associated with the heterogeneous infrastructures using a processor and a memory. The method analyzes the infrastructure security configurations based on the translated security best practice configurations and/or the translated common vulnerabilities and exposures (CVE). The method detects any discrepancy of the infrastructure security configurations from the translated security best practice configurations, and/or any translated CVE. The method alerts a set of devices and a user through one communication channel about any discrepancy.

23 Claims, 18 Drawing Sheets

(51) Int. Cl.
*H04L 29/08* (2006.01)
*G06N 5/02* (2006.01)

(52) U.S. Cl.
CPC .......... *H04L 63/1433* (2013.01); *H04L 63/20* (2013.01); *H04L 67/10* (2013.01); *H04L 67/22* (2013.01); *H04L 67/42* (2013.01)

(56) References Cited

U.S. PATENT DOCUMENTS

| | | |
|---|---|---|
| 8,751,941 B1 | 6/2014 | Kaushik et al. |
| 9,038,134 B1 | 5/2015 | Ackerman et al. |
| 9,246,941 B1 | 1/2016 | Gibson et al. |
| 9,621,585 B1 | 4/2017 | Satish et al. |
| 9,699,167 B1 | 7/2017 | Tovino et al. |
| 10,007,779 B1 | 6/2018 | McClintock et al. |
| 10,122,757 B1 | 11/2018 | Kruse et al. |
| 10,182,054 B2 | 1/2019 | Palmer et al. |
| 2003/0229900 A1* | 12/2003 | Reisman ............... G06F 16/954 725/87 |
| 2005/0232423 A1 | 10/2005 | Horvitz et al. |
| 2006/0069912 A1* | 3/2006 | Zheng ................ H04L 63/0823 713/151 |
| 2007/0061266 A1* | 3/2007 | Moore .................. G06Q 50/00 705/51 |
| 2007/0106754 A1* | 5/2007 | Moore .................. G06F 21/604 709/217 |
| 2009/0271863 A1* | 10/2009 | Govindavajhala .... G06F 21/577 726/23 |
| 2011/0184871 A1 | 7/2011 | Stahl |
| 2012/0167197 A1 | 6/2012 | Kruger et al. |
| 2012/0246098 A1 | 9/2012 | Chari et al. |
| 2013/0205028 A1 | 8/2013 | Crockett et al. |
| 2013/0226967 A1 | 8/2013 | Gross et al. |
| 2014/0181301 A1 | 6/2014 | Yendluri et al. |
| 2014/0181968 A1 | 6/2014 | Ge et al. |
| 2014/0337974 A1* | 11/2014 | Joshi ................... H04L 63/1425 726/23 |
| 2014/0359692 A1 | 12/2014 | Chari et al. |
| 2014/0379915 A1 | 12/2014 | Yang et al. |
| 2015/0033340 A1* | 1/2015 | Giokas ................ H04L 63/1433 726/23 |
| 2015/0135206 A1* | 5/2015 | Reisman .......... H04N 21/26283 725/18 |
| 2015/0373012 A1 | 12/2015 | Bartz et al. |
| 2015/0382201 A1 | 12/2015 | Chou et al. |
| 2016/0036833 A1 | 2/2016 | Ardeli et al. |
| 2016/0072814 A1 | 3/2016 | Martinelli |
| 2016/0277235 A1 | 9/2016 | Bhesania et al. |
| 2017/0026355 A1 | 1/2017 | Mathaiyan et al. |

OTHER PUBLICATIONS

Dr. Naqvi, Syed; Riguidel, Michel. Quantifiable Security Metrics for Large Scale Heterogeneous Systems. Proceedings 40th Annual 2006 International Carnahan Conference on Security Technology. https://ieeexplore.ieee.org/stamp/stamp.jsp?tp=&arnumber=4105339 (Year: 2006).*

Barrere, Martin et al. Vulnerability Assessment in Automatic Networks and Services: A Survey. IEEE Communications Surveys& Tutorials, vol. 16, Issue: 2. https://ieeexplore.ieee.org/stamp/stamp.jsp?tp=&arnumber=6587997 (Year: 2014).*

Oh, Tae et al. Best Security Practices for Android, BlackBerry, and iOS. 2012 The First IEEE Workshop on Enabling Technologies for Smartphone and Internet of Things (ETSIoT). https://ieeexplore.ieee.org/stamp/stamp.jsp?tp=&arnumber=6311252 (Year: 2012).*

Larsson, Emil; Sigholm, Johan. Papering Over the Cracks: The Effects on Introducing Best Practices on the Web Security Ecosystem. 2016 International Conference on Information Networking (ICOIN). https://ieeexplore.ieee.org/stamp/stamp.jsp?tp=& arnumber=7427064 (Year: 2016).*

* cited by examiner

METHOD AND SYSTEM TO DETECT DISCREPANCY IN INFRASTRUCTURE SECURITY CONFIGURATIONS FROM TRANSLATED SECURITY BEST PRACTICE CONFIGURATIONS IN HETEROGENEOUS ENVIRONMENTS

CLAIM OF PRIORITY

This non-provisional patent application is a conversion application of and claims priority to the U.S. Provisional Patent application No. 62/319,787 titled ACTIVITY BASED ACCESS CONTROL IN HETEROGENEOUS ENVIRONMENT filed on Apr. 8, 2016.

FIELD OF TECHNOLOGY

This disclosure relates generally to security technology and, more particularly, to a method, a device and/or a system to detect discrepancy in infrastructure security configurations from translated security best practice configurations in heterogeneous environments.

BACKGROUND

Infrastructure security (e.g., services, applications, data security) may be an important issue in any computer network infrastructure (including all aspects of IT, such as physical machines, virtual machines, containers, network, private cloud, public cloud, hybrid cloud, other cloud infrastructures, applications, SaaS applications, and/or devices, etc.) as there may be external attacks and/or insider threats (e.g., services/applications in-availability effected by infrastructure outage and/or attack, data being stolen using privileges, etc.). Infrastructure security may consist of policies adopted to prevent and/or monitor unauthorized access, misuse, modification, and/or denial of the computer network infrastructure. Infrastructure security may involve the authorization of access to data, services, and/or applications in the computer network infrastructure, which may be controlled by the network administrator.

Users may choose and/or may be assigned an ID, password and/or other authenticating information that may allow them access to information and/or programs within their authority as determined by their access privileges. The network administrator may need to structure a security system for its users to meet changing demands and threats.

Infrastructure security may be involved in organizations, enterprises, and/or other types of institutions, to secure the network, as well as protecting and/or overseeing operations being done. Networks may be private, such as within a company, and/or public, being open to public access. Infrastructure security may need to more rapidly adjust resources to meet fluctuating and/or unpredictable business demands of users without compromising its network security. For this, infrastructure security may need to update its security parameters to secure its resources.

Further, fluctuating and/or unpredictable business demands of users may raise security issues that should be addressed to prevent serious vulnerabilities. Adjusting infrastructure security may require allocations of space, hardware, and/or environmental controls. These assets may have to be refreshed periodically, resulting in additional capital expenditures by users.

SUMMARY

A method, system and/or an apparatus to detect discrepancy in infrastructure security configurations from translated security best practice configurations in heterogeneous environments is disclosed.

In one aspect, a method of an infrastructure security server communicatively coupled with a set of heterogeneous infrastructures includes translating a set of security best practice configurations of the heterogeneous infrastructures and/or a set of common vulnerabilities and exposures (CVE) of the heterogeneous infrastructures to programmatic execution. The method monitors the infrastructure security configurations associated with the heterogeneous infrastructures using a processor and a memory of the infrastructure security server. The method analyzes the infrastructure security configurations associated with the heterogeneous infrastructures based on the translated security best practice configurations and/or the translated common vulnerabilities and exposures (CVE). The method detects any discrepancy of the infrastructure security configurations from the translated security best practice configurations and/or any translated CVE in the infrastructure security configurations.

The method alerts a set of devices and a user through at least one communication channel about any discrepancy of the infrastructure security configurations from the translated security best practice configurations and any translated CVE in the infrastructure security configurations.

The method may translate the security best practice configurations of the heterogeneous infrastructures and/or the set of common vulnerabilities and exposures (CVE) of the heterogeneous infrastructures to a set of security rule definitions. The method may construct a set of security profiles each including a subset of the set of the security rule definitions.

The method may share the security rule definitions and the security profiles to be used by heterogeneous authorization systems and the heterogeneous cloud-based services using a platform. The platform may include a social network, a networked forum, a networked bulletin board, a networked chat room, a networked news group, and/or other communications channels. The platform may provide at least one application program interface (API) for third parties to develop the security rule definitions and the security profiles. The method may obtain other shared security rule definitions and other shared security profiles from third parties using the platform. The platform may include a social network, a networked forum, a networked bulletin board, a networked chat room, a networked news group, and/or other communications channels. The other shared security rule definitions and the other shared security profiles may be used by the heterogeneous authorization systems and the heterogeneous cloud-based services.

The method may analyze the infrastructure security configurations associated with the heterogeneous infrastructures based on the security rule definitions and the security profiles. In addition, the method may detect if the infrastructure security configurations violate any of the security rule definitions and the security profiles. The method may alert the set of devices and the user through the at least one communication channel if the infrastructure security configurations violate any of the security rule definitions and/or the security profiles. The method may suggest modifications of the infrastructure security configurations associated with the heterogeneous infrastructures to avoid violating any of the security rule definitions and/or the security profiles. The modifications of the infrastructure security configurations may be a manual, a semi-automatic, and/or a fully automatic.

In another aspect, a system includes an infrastructure security server communicatively coupled with a set of heterogeneous infrastructures. The system translates a set of security best practice configurations of the heterogeneous infrastructures and a set of common vulnerabilities and exposures (CVE) of the heterogeneous infrastructures to programmatic execution. The system monitors the infrastructure security configurations associated with the heterogeneous infrastructures using a processor and a memory of the infrastructure security server. The system analyzes the infrastructure security configurations associated with the heterogeneous infrastructures based on the translated security best practice configurations and/or the translated common vulnerabilities and exposures (CVE).

The system detects a discrepancy of the infrastructure security configurations from the translated security best practice configurations and/or the translated CVE in the infrastructure security configurations. The system alerts a set of devices and a user through at least one communication channel about any discrepancy of the infrastructure security configurations from the translated security best practice configurations and/or any translated CVE in the infrastructure security configurations. The system suggests modifications of the infrastructure security configurations associated with the heterogeneous infrastructures as a remediation for the discrepancy and/or the CVE. The modifications of the infrastructure security configurations are manual, semi-automatic, and/or fully automatic.

The system may include a security best practices automation engine. The system may identify the security best practices for the set of heterogeneous infrastructures. The system may create security rule definitions in the infrastructure for each of the translated security best practice configurations and/or the translated common vulnerabilities and exposures (CVE). The security rule definitions may include a rule, a violation triggering condition, and/or a remediation action. The security best practices automation engine may automatically execute the security rule definitions specified in each of the active security profiles.

The remediation action may include automatically fixing the violation, automatically fixing the violation and/or notifying the infrastructure security server. The remediation action may further include setting a timer for automatic fix to start from the point of violation trigger. In addition, remediation action may include sending a notification to the infrastructure security server about the violation, providing a way to schedule automatic fix for the violation, sending a notification to the infrastructure security server about the violation, providing a link to the user to fix it, and/or providing ways to fix the violation manually and/or semi-automatically.

In yet another aspect, an apparatus includes an infrastructure security server and a set of heterogeneous infrastructures communicatively coupled with the infrastructure security server. The set of heterogeneous infrastructures communicatively coupled with the infrastructure security server translates a set of security best practice configurations of the heterogeneous infrastructures and/or a set of common vulnerabilities and exposures (CVE) of the heterogeneous infrastructures to programmatic execution. The apparatus monitors the infrastructure security configurations associated with the heterogeneous infrastructures using a processor and a memory of the infrastructure security server. The apparatus analyzes the infrastructure security configurations associated with the heterogeneous infrastructures based on the translated security best practice configurations and/or the translated common vulnerabilities and exposures (CVE). The apparatus detects a discrepancy of the infrastructure security configurations from the translated security best practice configuration and/or the translated CVE in the infrastructure security configurations.

Further, the apparatus alerts a set of devices and a user through at least one communication channel about any discrepancy of the infrastructure security configurations from the translated security best practice configurations and/or any translated CVE in the infrastructure security configurations. The apparatus suggests modifications of the infrastructure security configurations associated with the heterogeneous infrastructures as a remediation for the discrepancy and/or the CVE. The modifications of the infrastructure security configurations are manual, semi-automatic, and/or fully automatic.

In one more aspect, a method of an infrastructure security server communicatively coupled with a set of heterogeneous infrastructures includes translating a set of security best practice configurations of the heterogeneous infrastructures and/or a set of common vulnerabilities and exposures (CVE) of the heterogeneous infrastructures to programmatic execution. The method monitors the infrastructure security configurations associated with the heterogeneous infrastructures using a processor and a memory of the infrastructure security server. The method analyzes the infrastructure security configurations associated with the heterogeneous infrastructures based on the translated security best practice configurations and/or the translated common vulnerabilities and exposures (CVE). Further, the method detects any discrepancy of the infrastructure security configurations from the translated security best practice configurations and/or any translated CVE in the infrastructure security configurations. In addition, the method suggests modifications of the infrastructure security configurations associated with the heterogeneous infrastructures as a remediation for the discrepancy and/or the CVE. The modifications of the infrastructure security configurations are manual, semi-automatic, and/or fully automatic modifications.

BRIEF DESCRIPTION OF THE FIGURES

The embodiments of this disclosure are illustrated by way of example and not limitation in the Figures of the accompanying drawings, in which like references indicate similar elements and in which.

Other features of the present embodiments will be apparent from the accompanying drawings and from the disclosure that follows.

DETAILED DESCRIPTION

Figure 1:
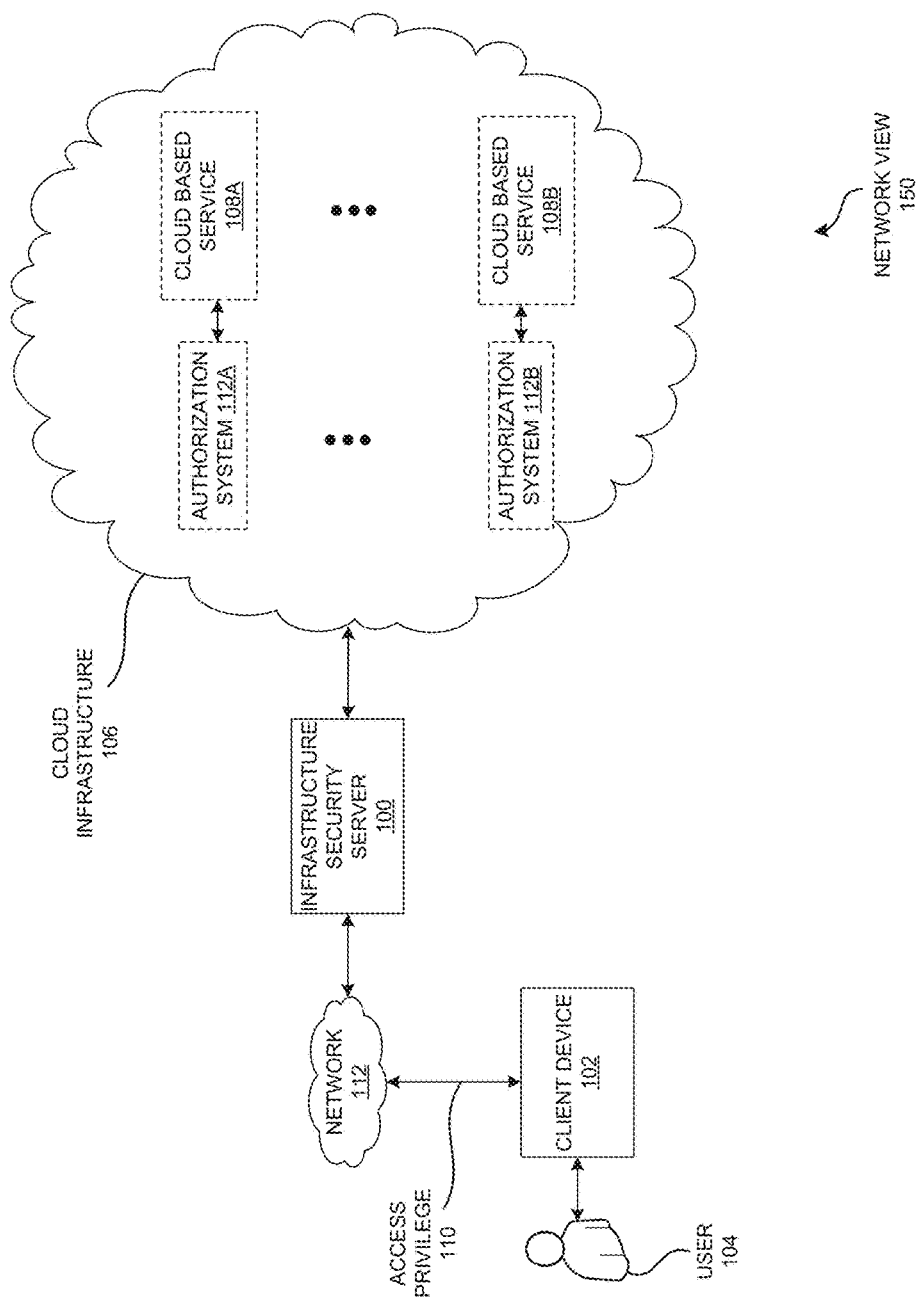
FIG. 1 is a network view of an infrastructure security server authenticating a user authorized to access a set of heterogeneous cloud-based services using at least one authorization system, according to one embodiment.

A method, system and/or an apparatus to detect discrepancy in infrastructure security configurations from translated security best practice configurations in heterogeneous environments is disclosed. FIG. 1 illustrates a network view 150 of an infrastructure security server 100 communicatively coupled with a client device 102 operated by a user 104 through a network 112, as well as with a set of cloud based services (e.g., 108A, 108B) in a cloud infrastructure 106. According to one embodiment, a method of the infrastructure security server 100 includes authenticating that a user 104 of a client device 102 is authorized to access a set of heterogeneous cloud-based services (e.g., 108A, 108B) using at least one authorization system 200. The method monitors (e.g., using the monitor module 202) an activity of the user 104 when accessing any of the set of heterogeneous cloud-based services (e.g., 108A, 108B) over a period of time (e.g., using the monitor module 202) using a processor 204 and a memory 206. The method dynamically adjusts (e.g., using dynamic privilege adjustment 712) access privileges 110 to at least one of the set of heterogeneous cloud-based services (e.g., 108A, 108B) based on the monitoring (e.g., using the monitor module 202) of the activity of the user 104 over the period of time.

The adjustment to the access privileges 110 may include a revocation 1800 and/or a grant 1800 of access to the user 104 to a particular service of the set of heterogeneous cloud-based services (e.g., 108A, 108B). The adjustment to the access privileges 110 may include a revocation 1800 of access to the user 104 to a particular service of the set of heterogeneous cloud-based services (e.g., 108A, 108B) when the monitored activity of the user (e.g., user activities 1712) indicates that the user 104 does not access the particular service within the period of time. The adjustment to the access privileges may be manual, semi-automatic and/or fully-automatic. The adjustment to the access privilege 110 may reduce a risk 1102 of at least one of a theft, a tampering, a hijacking, an accident, a modification, a deletion, an addition, and/or a destruction of a content accessible through the set of heterogeneous cloud-based services (e.g., 108A, 108B).

The method may interface between each of the set of heterogeneous cloud-based services (e.g., 108A, 108B) using a customized transformation module 902 designed to normalize data exchange between each of the heterogeneous cloud-based services (e.g., 108A, 108B) and the infrastructure security server 100 using a transformation engine 902 of the infrastructure security server 100.

A role (e.g., associated with role privileges 1708) of the user 104 may be irrelevant when determining whether the revocation of the access to the user 104 is necessary based on the monitoring (e.g., using the monitor module 202) of the activity of the user (e.g., user activities 1712) when accessing the set of heterogeneous cloud-based services (e.g., 108A, 108B) over the period of time.

The infrastructure security server 100 may include a policy based automation module 606 to enable an administrator of the infrastructure security server 100 to automatically adjust a privilege 110 of the user 104 based on a policy of an organization responsible for security of access to the set of heterogeneous cloud-based services (e.g., 108A, 108B). The policy may be a time-based policy, a rule-based policy, a predictive policy, a role-based policy (e.g., associated with role privileges 1708), a context-based policy, a risk-score 210 based policy, a segment based policy, and/or a customized policy. Different variations of policies may be created based on customer needs. The policies may be applicable to one or more authorization systems covering all aspects of the information technology (IT) infrastructure (e.g., physical, virtual, containers, private cloud, public cloud infrastructures, applications, SaaS applications, and/or devices, etc.).

Figure 2:
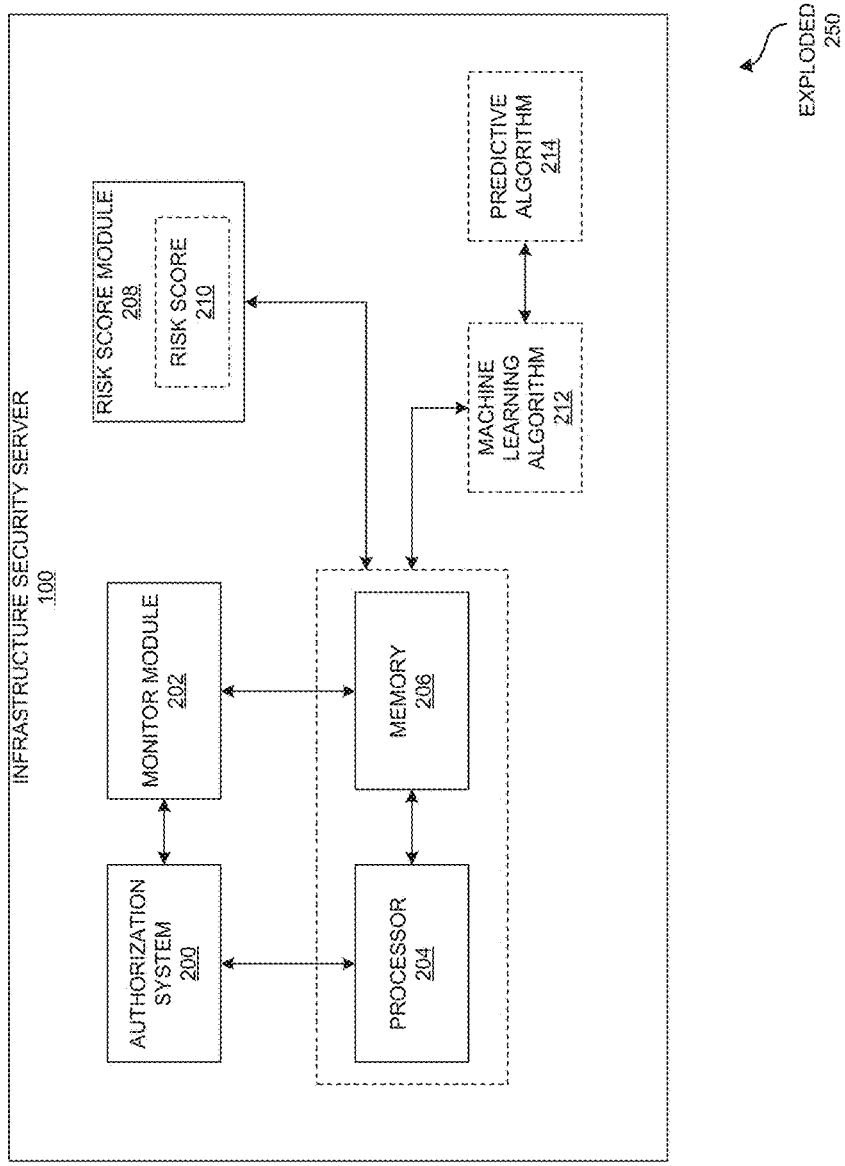
FIG. 2 is an exploded view of the infrastructure security server of FIG. 1, according to one embodiment.

The risk score based policy (e.g., created using a risk score module 208 of the infrastructure security server 100 as shown in FIG. 2) may utilize a risk score 210 that is at least one of a combination of an excessive privilege risk score, a configuration violation risk score, a common vulnerabilities risk score, an exposure risk score, a context based risk score, and/or a custom risk score.

The method may utilize a computer and/or a machine learning algorithm 212 of the computer to find an operation likely to be performed by the user 104 on a frequent basis, wherein the frequent basis may be any one of a daily basis, a weekly basis, a monthly basis, and/or a quarterly basis. In another embodiment, the frequent basis may be a holiday, a vacation schedule, a special occasion, etc. In yet another embodiment, the method may utilize a contextual information, (e.g., a geographic location, a time of day, an IP address, etc.) of the computer to find an operation likely to be performed by the user 104 on a frequent basis. The method may predict (e.g., using a predictive algorithm 214 of FIG. 2) which operation is likely to be performed to form a prediction. The privilege 110 may be dynamically adjusted (e.g., using dynamic privilege adjustment 712) based on the prediction.

The heterogeneous cloud-based services (e.g., 108A, 108B) may include an infrastructure service, a platform service, and/or an application service.

The adjustment to the access privilege 110 may include a grant of access to the user 104 to a different service of the set of heterogeneous cloud-based services (e.g., 108A, 108B) when any of these occurs: (1) the monitored activity of the user (e.g., user activities 1712) to indicate that the user 104 is likely to require the different service within the period of time, (2) the user to request the access to the different service of the set of heterogeneous cloud-based services (e.g., 108A, 108B) with low associated risk and the access is granted, and/or (3) the user to request the access to the different service of the set of heterogeneous cloud-based services (e.g., 108A, 108B) with high associated risk and the access is granted. The grant of access may be manual, semi-automatic, and/or completely automatic. These newly granted access privileges 110 may be set to expire after some time. A newly granted access privilege 110 may be time limited with a TTL (time to live) based on a set of policies. Each newly granted access privileges 110 may have a time window beyond which the access privilege 110 will be revoked automatically.

The revocation of access may be manual, semi-automatic, and/or completely automatic. The grant of access may be manual, semi-automatic, and/or completely automatic. These newly granted access privileges 110 may be set to expire after some time. A newly granted access privilege 110 may be time limited with a TTL (time to live) based on a set of policies. In another embodiment, the newly granted access privilege 110 may be time limited with a TTL (time to live) to include lease and/or lease renewal based on a set of policies. A newly granted access privileges 110 may have a time window beyond which the access privilege 110 will be revoked automatically. The privileges may have some limitations based on the context. For example, some high risk privileges may be automatically revoked and/or unavailable if the user 104 authenticates from a remote location.

More than one authorization system may be used to provide the set of heterogeneous cloud-based services (e.g., 108A, 108B). Each heterogeneous cloud-based service (e.g., 108A, 108B) may use one of the more than one authorization system.

The access privileges of the at least one heterogeneous authorization system associated with the set of heterogeneous cloud-based services may be centrally managed. Each heterogeneous cloud-based service may use one of the at least one authorization system.

The dynamic adjustment (e.g., using dynamic privilege adjustment 712) of the access privilege 110 of the user 104 to the at least one of the set of heterogeneous cloud-based services (e.g., 108A, 108B) may be based on security rules of a security profile of the user 104. The security rules may be defined by a security rule definition module.

In another embodiment, a method of an infrastructure security server having access to a set of heterogeneous cloud-based services (e.g., 108A, 108B) using a set of heterogeneous authorization systems (e.g., 112A, 112B) includes analyzing security risk associated with the heterogeneous cloud-based services (e.g., 108A, 108B) and the heterogeneous authorization systems (e.g., 112A, 112B) using a processor and a memory of the infrastructure security server. A security risk score associated with the heterogeneous cloud-based services and the heterogeneous authorization systems (e.g., 112A, 112B) is computed. At least one modification associated with the heterogeneous cloud-based services (e.g., 108A, 108B) and the heterogeneous authorization systems (e.g., 112A, 112B) is recommended to reduce the security risk score. The security risk score is at least one of a combination of an excessive privilege risk score, a configuration violation risk score, a common vulnerabilities risk score, an exposure risk score, a context based risk score, and a custom risk score.

The risk score 210 may have a granularity spanning any one of singular privilege 110, a group of privileges 110, an action, an operation, a software, an application, a device, a component, a machine, a system, an authorization system (e.g., 112A, 112B), a network, a server device, a client device 102, a cloud-based device, a cloud-based service, an infrastructure, a user 104, a role (e.g., associated with role privileges 1708), a task, a job, a function, a project, a group, a company, an enterprise, a geographic region, a logical region, a user privilege 110, a machine privilege, a cloud-based privilege, and/or a service privilege.

The risk score 210 may be multi-dimensional across heterogeneous authorization systems (e.g., 112A, 112B). The multiple dimensions may be at least one of a risk score 210 based on a privilege 110, a risk score 210 based on a group of privileges 110, a risk score 210 based on a user, a risk score 210 based on a group, a risk score 210 based on a role (e.g., associated with role privileges 1708), a risk score 210 based on a project, a risk score 210 based on a service, a risk score 210 based on an application, a risk score 210 based on one of the set of heterogeneous cloud-based services (e.g., 108A, 108B), a risk score 210 based on an authorization system (e.g., 112A, 112B), a risk score 210 based on a network, a risk store 210 based on context, a risk score 210 based on an infrastructure, a risk score 210 based on an action, a risk score 210 based on an operation, a risk score 210 based on a software, a risk score 210 based on a hardware, a risk score 210 based on a configuration, a risk score 210 based on a configuration violation, a risk score 210 based on a common vulnerability, a risk score 210 based on a risk exposure, a risk score 210 based on one of the heterogeneous authorization systems (e.g., 112A, 112B), a risk score 210 based on a geographic region, a risk score 210 based on a logical region, a risk score 210 based on a task, a risk score 210 based on a function, a risk score 210 based on a company, and/or a risk score 210 based on an enterprise. In a further embodiment, multiple dimensions may be at least one of a risk score 210 based on an IDS alerts, a risk score 210 based on operation rates, a risk score 210 based on privilege grant rates, a risk score 210 based on server utilization, and a risk score 210 based on recent corporate events (e.g., layoffs, budgets, sales, etc.).

In yet another embodiment, a method of an infrastructure security server 100 communicatively coupled with a set of heterogeneous infrastructures 1518 (e.g., 108A, 108B, 112A, 112B) includes translating (e.g., using translation 1505) a set of security best practice configurations 1502 of the heterogeneous infrastructures 1518 (e.g., 108A, 108B, 112A, 112B) and/or a set of common vulnerabilities and exposures (CVE) 1503 of the heterogeneous infrastructures 1518 (e.g., 108A, 108B, 112A, 112B) to programmatic execution. The infrastructure security configurations 1516 associated with the heterogeneous infrastructures 1518 (e.g., 108A, 108B, 112A, 112B) are monitored (e.g., using config monitoring 1520) using a processor and a memory of the infrastructure security server. The infrastructure security configurations 1516 associated with the heterogeneous infrastructures 1518 (e.g., 108A, 108B, 112A, 112B) are analyzed based on the translated security best practice configurations 1502 and/or the translated common vulnerabilities and exposures (CVE) 1503 (e.g., translated using translation 1505). Any discrepancy of the infrastructure security configurations 1516 from the translated security best practice configurations 1502 and/or any translated CVE 1503 in the infrastructure security configurations 1516 are detected. A set of devices and a user are alerted (e.g., using alert 1511) about any discrepancy of the infrastructure security configurations 1516 from the translated security best practice configurations and/or any translated CVE 1503 in the infrastructure security configurations 1516. At least one communication channel and/or the set of devices may be used to alert the user. Modifications of the infrastructure security configurations 1516 associated with the heterogeneous infrastructures 1518 (e.g., 108A, 108B, 112A, 112B) are suggested as a remediation for the discrepancy and the CVE 1503.

The infrastructure security server may translate (e.g., using translation 1505) the security best practice configurations 1502 of the heterogeneous infrastructures 1518 and/or the set of common vulnerabilities and exposures (CVE) of the heterogeneous infrastructures 1518 to a set of security rule definitions 1504. A set of security profiles 1512 each comprising a subset of the set of the security rule definitions 1504 may be constructed, according to one embodiment.

The security rule definitions and the security profiles to be used by heterogeneous authorization systems and heterogeneous cloud-based services may be shared using a platform. The platform may include a social network, a networked forum, a networked bulletin board, a networked chat room, a networked news group, and/or other communications channels, according to one embodiment.

A platform may provide at least one application program interface (API) for third parties (e.g., other system users, developers, users, etc.) to develop the security rule definitions 1504 and the security profiles 1512.

Other shared security rule definitions and other shared security profiles from third parties may be obtained using a platform. The platform may include a social network, a networked forum, a networked bulletin board, a networked chat room, a networked news group, and/or other communications channels. The other shared security rule definitions and the other shared security profiles may be used by heterogeneous authorization systems and heterogeneous cloud-based services, according to one embodiment.

The infrastructure security configurations 1516 associated with the heterogeneous infrastructures 1518 (e.g., 108A, 108B, 112A, 112B) may be analyzed based on the security rule definitions 1504 and the security profiles 1512. Operations may be performed to detect if the infrastructure security configurations 1516 violate any of the security rule definitions 1504 and the security profiles 1512. The set of devices and the user may be alerted (e.g., using alert 1511) if the infrastructure security configurations 1516 violate any of the security rule definitions 1504 and the security profiles 1512. The user may be alerted through the communication channel(s) and/or the set of devices. Modifications of the infrastructure security configurations 1516 associated with the heterogeneous infrastructures 1518 (e.g., 108A, 108B, 112A, 112B) may be suggested to avoid violating any of the security rule definitions 1504 and the security profiles 1512, according to one embodiment.

A new security profile and/or a new security rule definition may be constructed based on the security rule definitions 1504 and the security profiles 1512.

A new security profile and/or a new security rule definition may be constructed based on the security rule definitions 1504, the security profiles 1512, the other shared security rule definitions from the third parties and/or the other shared security profiles from the third parties.

Users in a cloud-based computer network may be given access to various privileges (e.g., access privileges 110) to perform various operations, tasks and/or functions. Some operations and/or privileges may be low risk 1102 in nature with relatively low levels of potential damage when compromised, while some may be high risk 1102. Some cloud-based operations may be intrinsically high risk 1102. Some database operations may be high risk 1102, especially those involving deletion and/or modification of data. Some operations may be low risk 1102 if executed in one context (e.g., copying a file from a hard disk in and/or to an office computer) but may be high risk 1102 if executed in another context (e.g., copying a file from the cloud in and/or to a mobile device in a remote, third-world country), according to one embodiment.

The privileges of the users 104 (e.g., user privileges 1710) may be assigned by a system administrator (e.g., system user 904). The privilege assignment may be based on groups to which the users belong, and/or roles (e.g., associated with role privileges 1708) of the users 104 in the company/institution, etc. The granularity of privileges (e.g., user privilege 1710) may be coarse in some systems, and fine in other systems. In systems with fine granularity of privileges (e.g., 1710), assigning access to privileges (e.g., 1710) may be tedious, and/or may require in-depth domain knowledge 1501 of different roles (e.g., associated with role privileges 1708) and/or users 104. In systems with coarse granularity of privilege (e.g., user privilege 1710), assigning access to privileges (e.g., user privilege 1710) may be relatively simple though some of the privileges (e.g., user privilege 1710) assigned to a user 104 may not be needed and/or used by the user 104, according to one embodiment.

In some situations, a user 104 (e.g., a CEO of a company) may be assigned a lot privileges (e.g., user privileges 1710) that the user 104 may not need on a daily basis. The privileges (e.g., user privileges 1710) may be able to cause great harm if the user's account and/or the user's machine is compromised. It would be desirable to make dynamic adjustment (e.g., using dynamic privilege adjustment 712) to the user's privileges 1710 such that unused and/or unneeded privileges (e.g., user privileges 1710) may be removed (e.g., revoke 1800) so that the harm may be minimized in the unfortunate event of the user's account and/or the user's machine being compromised. Unfortunately, the system administrator (e.g., system user 904) may not have enough insight to assign "just enough" privileges 1002 to the user 104 according to the user 104 daily duties and/or activities (e.g., user activities 1712), according to one embodiment.

There may be a need to balance the daily duties and/or activities (user activities 1712) of the user 104 versus the risk 1102 associated with the privileges 1710. There may be a need to monitor the daily activities of the user (e.g., user activities 1712). There may also be a need to assess the risk 1102 associated with individual privileges 1710 and/or operations (e.g., the degree of risk 1102 for downloading a file from an unknown cloud and/or deleting a database, the degree of risk 1102 for viewing a file and/or reading email on the local computer). There may be a need to simulate the effects of a certain set of privilege access changes before applying the changes. There may be a need of a tool to help the system administrator (e.g., system user 904) to reuse some privilege assignment settings (e.g., best practices 1502, security rule definitions 1504, security profiles 1512, and/or privilege management policies 1716) on one user account in other accounts and/or other systems, according to one embodiment.

This disclosure relates to a method and/or a system of an activity based access control (e.g., using user activity and behavior based privilege management 604) in heterogeneous environments (e.g., and in some aspects, certain embodiments may be operable in homogeneous environments). In one embodiment, the user's access to privileges (e.g., user privileges 1710) is controlled dynamically (e.g., using dynamic privilege adjustment 712) based on the activities of the user 1710 (e.g., including the usage of privileges) in the cloud-based environment with heterogeneous authentication systems 1702 and/or authorization systems 1704 (e.g., computers with various operating systems and/or access protocol). Security rule definitions 1504, security policies 1512, and/or policies (e.g., privilege management policies 1716) are developed to govern the revoking 1800 and/or granting 1800 of privileges.

A method, system and an apparatus of infrastructure security server 100 is disclosed. FIG. 1 illustrates a network view 150 of an infrastructure security server 100 communicatively coupled with a client device 102 operated by a user 104 through a network 112, as well as with a set of cloud based services 108 in a cloud infrastructure 106, according to one embodiment. A method of the infrastructure security server 100 includes authenticating that a user 104 of a client device 102 is authorized to access a set of heterogeneous cloud-based services (e.g., 108A, 108B) using at least one authorization system 200. The access privileges (e.g., user privileges 1710) across the at least one authorization system (e.g., 112A, 112B) will be dynamically adjusted (e.g., using dynamic privilege adjustment 712) by the infrastructure security server 100 based on the monitored activity of the user (e.g., user activities 1712). The method monitors (e.g., using the monitor module 202) an activity of the user (e.g., user activities 1712) when accessing any of the set of heterogeneous cloud-based services (e.g., 108A, 108B) over a period of time (e.g., using monitor module 202) using a processor 204 and a memory 206. The method dynamically adjusts (e.g., using dynamic privilege adjustment 712) an access privilege 110 to at least one of the set of heterogeneous cloud-based services (e.g., 108A, 108B) based on the monitoring (e.g., using the monitor module 202) of the activity of the user (e.g., user activities 1712) over the period of time, according to one embodiment.

The adjustment to the access privileges 110 (e.g., using privilege adjustor 1718) may include a revocation 1800 and/or a grant 1800 of access to the user 104 to a particular service of the set of heterogeneous cloud-based services (e.g., 108A, 108B) when the monitored (e.g., using the monitor module 202) activity of the user (e.g., user activities 1712) indicates that the user 104 does not access the particular service within the period of time. The adjustment to the access privileges may be manual, semi-automatic and/or fully-automatic. The adjustment to the access privileges 110 (e.g., using privilege adjustor 1718) may reduce a risk 1102 of at least one of a theft, a tampering, a hijacking, an accident, a modification, a deletion, an addition, and/or a destruction of content accessible through the set of heterogeneous cloud-based services (e.g., 108A, 108B), according to one embodiment.

The method may interface between each of the set of heterogeneous cloud-based services (e.g., 108A, 108B) using a customized transformation module 902 designed to normalize data exchange between each of the heterogeneous cloud-based services (e.g., 108A, 108B) and the infrastructure security server 100 using a transformation engine 902 of the infrastructure security server 100, according to one embodiment.

A role of the user 104 may be irrelevant when determining whether the revocation and/or grant of the access to the user 104 is necessary based on the monitoring (e.g., using the monitor module 202) of the activity of the user (e.g., user activities 1712) when accessing the set of heterogeneous cloud-based services (e.g., 108A, 108B) over the period of time, according to one embodiment.

The revocation 1800 of access may be manual, semi-automatic, and/or completely automatic (e.g., privileges unassigned due to recent non-usage 1108). The grant 1800 of access may be manual (e.g., privilege assigned upon approval 1110), semi-automatic (e.g., privilege assigned upon approval 1110), and/or completely automatic (e.g., privilege auto assigned upon recent usage 1106). These newly granted access privileges (e.g., user privileges 1710) may be set to expire after some time. A newly granted access privilege (e.g., user privileges 1710) may be time limited with a TTL (time to live) based on a set of policies. In another embodiment, the newly granted access privilege 110 may be time limited with a TTL (time to live) to include lease and/or lease renewal based on a set of policies. The newly granted access privileges (e.g., user privileges 1710) may have a time window beyond which the access privileges (e.g., user privileges 1710) will be revoked automatically, according to one embodiment.

The infrastructure security server 100 may include a policy based automation module 606 to enable an administrator (e.g., system user 904) of the infrastructure security server 100 to automatically adjust a privilege of the user (e.g., user privileges 1710) based on a policy (e.g., privilege management policies 1716) of an organization responsible for security of access to the set of heterogeneous cloud-based services (e.g., 108A, 108B). The policy (e.g., privilege management policies 1716) may be a time-based policy, a rule-based policy, a predictive policy, a role-based policy, a context-based policy, a risk-score 210 based policy, a segment based policy, and/or a customized policy. Different variations of policies (e.g., privilege management policies 1716) may be created based on customer needs. The policies (e.g., privilege management policies 1716) may be applicable to one or more authorization systems (e.g., authorization and management server 1704) covering all aspects of the information technology (IT) infrastructure (e.g., physical, virtual, containers, private cloud, public cloud infrastructures, applications, SaaS applications, and/or devices, etc.), according to one embodiment.

The risk score based policy (e.g., privilege management policies 1716) may utilize a risk score 210 that is at least one of a combination of an excessive privilege risk score, a configuration violation risk score, a common vulnerabilities risk score, an exposure risk score, and a custom risk score, according to one embodiment.

The method may utilize a computer (e.g., infrastructure security server 100) and/or a machine learning algorithm 212 of the computer to find an operation likely to be performed by the user 104 on a frequent basis, wherein the frequent basis may be any one of a daily basis, a weekly basis, a monthly basis, and/or a quarterly basis. In another embodiment, the frequent basis may be a holiday, a vacation schedule, a special occasion, etc. In yet another embodiment, the method may utilize a contextual information, (e.g., a geographic location, a time of day, an IP address, etc.) of the computer to find an operation likely to be performed by the user 104 on a frequent basis. The method may predict (e.g., using a predictive algorithm 214 of FIG. 2) which operation is likely to be performed to form a prediction (from predictive algorithm 214 of FIG. 2). The privilege may be dynamically adjusted (e.g., using dynamic privilege adjustment 712) based on the predication (from predictive algorithm 214 of FIG. 2), according to one embodiment.

The heterogeneous cloud-based services (e.g., 108A, 108B) may include an infrastructure service, a platform service, and/or an application service, according to one embodiment The adjustment (e.g., performed in privilege adjustor 1718) to the access privilege (e.g., user privilege 1710) may include a grant 1800 of access to the user 104 to a different service of the set of heterogeneous cloud-based services (e.g., 108A, 108B) when any of these occurs: (1) the monitored activity of the user 104 (e.g., user activity 1712) to indicate that the user 104 is likely to require the different service within the period of time, (2) the user 104 to request the access to the different service of the set of heterogeneous cloud-based services (e.g., 108A, 108B) with low associated risk 1102 and the access is granted (e.g., auto assigned upon recent usage 1106), and/or (3) the user 104 to request the access to the different service of the set of heterogeneous cloud-based services (e.g., 108A, 108B) with high associated risk 1102 and the access is granted (e.g., assigned upon approval 1110). The grant 1800 of access may be manual (e.g., assigned upon approval 1110), semi-automatic (e.g., assigned upon approval 1110), and/or completely automatic (e.g., auto assigned upon recent usage 1106). These newly granted access privileges (e.g., user privileges 1710) may be set to expire after some time. A newly granted access privilege (e.g., user privileges 1710) may be time limited with a TTL (time to live) based on a set of policies (e.g., privilege management policies 1716). A newly granted access privileges (e.g., user privileges 1710) may have a time window beyond which the access privilege (e.g., user privileges 1710) will be revoked (e.g., in 1800) automatically, according to one embodiment.

More than one authorization system (e.g., 112A, 112B, 1704) may be used to provide the set of heterogeneous cloud-based services (e.g., 108A, 108B). Each heterogeneous cloud-based service (e.g., 108A, 108B) may use one of the more than one authorization system (e.g., 112A, 112B), according to one embodiment.

The access privileges of the at least one heterogeneous authorization system associated with the set of heterogeneous cloud-based services may be centrally managed. Each heterogeneous cloud-based service may use one of the at least one authorization system, according to one embodiment.

The dynamic adjustment (e.g., using dynamic privilege adjustment 712) of the access privilege of the user 104 (e.g., user privileges 1710) to the at least one of the set of heterogeneous cloud-based services (e.g., 108A, 108B) may be based on security rule definitions (SRDs) 1504 of a security profile (SP) 1512 associated with the user 104. The security rule definitions (SRD) 1504 may be defined by a security rule definition (SRD) module, according to one embodiment.

In another embodiment, a method of an infrastructure security server 100 having access to a set of heterogeneous cloud-based services (e.g., 108A, 108B) using a set of heterogeneous authorization systems (e.g., 112A, 112B) includes analyzing security risk associated with the heterogeneous cloud-based services (e.g., 108A, 108B) and the heterogeneous authorization systems (e.g., 112A, 112B) using a processor and a memory of the infrastructure security server. A security risk score associated with the heterogeneous cloud-based services (e.g., 108A, 108B) and the heterogeneous authorization systems (e.g., 112A, 112B) is computed. At least one modification associated with the heterogeneous cloud-based services (e.g., 108A, 108B) and the heterogeneous authorization systems (e.g., 112A, 112B) is recommended to reduce the security risk score. The security risk score is at least one of a combination of an excessive privilege risk score, a configuration violation risk score, a common vulnerabilities risk score, an exposure risk score, a context based risk score, and a custom risk score, according to one embodiment.

The risk score 210 may have a granularity spanning any one of singular privilege 110, a group of privileges 110, an action, an operation, a software, an application, a device, a component, a machine, a system, an authorization system (e.g., 112A, 112B), a network, a server device, a client device 102, a cloud-based device, a cloud-based service, an infrastructure, a user 104, a role (e.g., associated with role privileges 1708), a task, a job, a function, a project, a group, a company, an enterprise, a geographic region, a logical region, a user privilege 110, a machine privilege, a cloud-based privilege, and/or a service privilege, according to one embodiment.

The risk score 210 may be multi-dimensional across heterogeneous authorization systems (e.g., 112A, 112B). The multiple dimensions may be at least one of a risk score 210 based on a privilege 110, a risk score 210 based on a group of privileges 110, a risk score 210 based on a user, a risk score 210 based on a group, a risk score 210 based on a role (e.g., associated with role privileges 1708), a risk score 210 based on a project, a risk score 210 based on a service, a risk score 210 based on an application, a risk score 210 based on one of the set of heterogeneous cloud-based services (e.g., 108A, 108B), a risk score 210 based on an authorization system (e.g., 112A, 112B), a risk score 210 based on a network, a risk store 210 based on context, a risk score 210 based on an infrastructure, a risk score 210 based on an action, a risk score 210 based on an operation, a risk score 210 based on a software, a risk score 210 based on a hardware, a risk score 210 based on a configuration, a risk score 210 based on a configuration violation, a risk score 210 based on a common vulnerability, a risk score 210 based on a risk exposure, a risk score 210 based on one of the heterogeneous authorization systems (e.g., 112A, 112B), a risk score 210 based on a geographic region, a risk score 210 based on a logical region, a risk score 210 based on a task, a risk score 210 based on a function, a risk score 210 based on a company, and/or a risk score 210 based on an enterprise, according to one embodiment.

In another embodiment, a method of an infrastructure security server communicatively coupled with a set of heterogeneous infrastructures 1518 (e.g., 108A, 108B, 112A, 112B) includes translating (e.g., using translation 1505) a set of security best practice configurations 1502 of the heterogeneous infrastructures 1518 (e.g., 108A, 108B, 112A, 112B) and/or a set of common vulnerabilities and exposures (CVE) 1503 of the heterogeneous infrastructures 1518 (e.g., 108A, 108B, 112A, 112B) to programmatic execution. The infrastructure security configurations 1516 associated with the heterogeneous infrastructures 1518 (e.g., 108A, 108B, 112A, 112B) are monitored (using config monitoring 1520) using a processor and a memory of the infrastructure security server. The infrastructure security configurations 1516 associated with the heterogeneous infrastructures 1518 (e.g., 108A, 108B, 112A, 112B) are analyzed based on the translated security best practice configurations 1502 and/or the translated common vulnerabilities and exposures (CVE) 1503 (translated using translation 1505). Any discrepancy of the infrastructure security configurations 1516 from the translated security best practice configurations 1502 and/or any translated CVE 1503 in the infrastructure security configurations 1516 are detected. A set of devices and a user are alerted (e.g., using alert 1511) about any discrepancy of the infrastructure security configurations 1516 from the translated security best practice configurations and/or any translated CVE 1503 in the infrastructure security configurations 1516. The user may be alerted using at least one communication channel and/or the set of devices. Modifications of the infrastructure security configurations 1516 associated with the heterogeneous infrastructures 1518 (e.g., 108A, 108B, 112A, 112B) are suggested as a remediation for the discrepancy, according to one embodiment.

The infrastructure security server may translate (e.g., using translation 1505) the security best practice configurations 1502 of the heterogeneous infrastructures 1518 and/or the set of common vulnerabilities and exposures (CVE) of the heterogeneous infrastructures 1518 to a set of security rule definitions 1504. A set of security profiles 1512 each comprising a subset of the set of the security rule definitions 1504 may be constructed, according to one embodiment.

The security rule definitions and the security profiles to be used by heterogeneous authorization systems and heterogeneous cloud-based services may be shared using a platform. The platform may include a social network, a networked forum, a networked bulletin board, a networked chat room, a networked news group, and/or other communications channels, according to one embodiment.

A platform may provide at least one application program interface (API) for third parties (e.g., other system users, developers, users, etc.) to develop the security rule definitions 1504 and the security profiles 1512, according to one embodiment.

Other shared security rule definitions and other shared security profiles from third parties may be obtained using a platform. The platform may include a social network, a networked forum, a networked bulletin board, a networked chat room, a networked news group, and/or other communications channels. The other shared security rule definitions and the other shared security profiles may be used by heterogeneous authorization systems and heterogeneous cloud-based services, according to one embodiment.

The infrastructure security configurations 1516 associated with the heterogeneous infrastructures 1518 (e.g., 108A, 108B, 112A, 112B) may be analyzed based on the security rule definitions 1504 and the security profiles 1512. Operations may be performed to detect if the infrastructure security configurations 1516 violate any of the security rule definitions 1504 and the security profiles 1512. The set of devices and the user may be alerted (e.g., using alert 1511) if the infrastructure security configurations 1516 violate any of the security rule definitions 1504 and the security profiles 1512. The user may be alerted using at least one communication channel and/or the set of devices. Modifications of the infrastructure security configurations 1516 associated with the heterogeneous infrastructures (e.g., 108A, 108B, 112A, 112B) may be suggested to avoid violating any of the security rule definitions 1504 and the security profiles 1512, according to one embodiment.

A new security profile and/or a new security rule definition may be constructed based on the security rule definitions 1504 and the security profiles 1512, according to one embodiment.

A new security profile and/or a new security rule definition may be constructed based on the security rule definitions 1504, the security profiles 1512, the other shared security rule definitions from the third parties and/or the other shared security profiles from the third parties, according to one embodiment.

In one embodiment, existing roles/groups based privilege management models (e.g., prior art 300) may be failing. User activity 1710 based privilege management (e.g., as done in privilege adjustor 1718, and/or in user activity and behavior based privilege management 604) utilizing the various embodiments of the infrastructure security server 100 is applied. For example, the infrastructure security server 100 may provide for:

a. Dynamic assessment of user privileges 1710 as per the user activity 1712.
b. Policy based automation 606 (e.g., using privilege management policies 1716) to revoke, and grant privileges (e.g., using privilege adjustor 1718, which is infrastructure security server 100).
c. Dynamically adjusting privileges (e.g., using dynamic privilege adjustment 712, and/or using privilege adjustor 1718) based on policies (e.g., privilege management policies 1716), with the ability to apply different policies (e.g., using privilege management policies 1716) for different authorization systems (e.g., authorization and management server 1704), and/or without changing the authentication systems (e.g., identity and authentication server 1702).
d. Generic framework defined for privileges (e.g., user privileges 1710), weightages. This may allow standard algorithms (e.g., machine learning algorithm 212, and/or predictive algorithm 214) to be used/implemented for learning and/or other calculations (e.g., risk score 210). This may allow the system users 904, vendors to change the values/attributes without modifying the code.
e. Unique learning algorithms (e.g., machine learning algorithm 212, and/or predictive algorithm 214) that combine the standard machine learning with domain knowledge 1501. The information presented may be accurate and/or contains no false positives.

In one embodiment, applying knowledge of best practices 1502 for modern infrastructure in dynamic environment may be a daunting task particularly due to limited resources. This coupled with insider threats 402 may multiply risk exposure 1102. In the embodiment, a method, a system and an apparatus are constructed to translate (e.g., using translation 1505) knowledge of best practices 1502 to programmable logic for automation so that the best practices 1502 can be applied across heterogeneous silos. For example, through the platform, i. System users 904 may add SP (Security Profile) 1512/SRD (Security Rule Definition) 1504. The system users 904 may translate (using translation 1505) the best practices 1502 into Security Profiles (SP) 1512 and/or security rules definitions (SRDs) 1504.

ii. Vendors can publish.

iii. Interdependent logic may tie the modules and/or enhance the strength.

iv. Community knowledge can be added.

v. Custom applications can be built for additional value.

In another embodiment, scalable knowledge of best practices 1502 is translated (e.g., using translation 1505) to SP (security profile) 1512 and/or SRD (security rule definition) 1504 across the silos of modern infrastructure and/or may be monitored (e.g., using the monitor module 202). User level, role level, task level, function level, and/or operation level best practice in security settings (e.g., cloud-based systems and/or services, etc.) are formalized in the form of SRD (security rule definition) 1504 and/or SP (security profiles) 1512 that can be applied across different systems. A transformation module 902 and/or transformation engine 902 may be applied to port SP 1512 and/or SRD 1504 from one system/method/apparatus to another. A unified method to represent SP 1512 and/or SRD 1504 may be defined.

Risk exposure 1102 of infrastructure may vary when user privileges 1710 are overlaid. In another embodiment, the user privileges 1710 in multiple cloud-based systems and/or services are overlaid and/or considered jointly in an analysis to identify subtle risks 1102 that may not be easily detectable when considered separately, according to one embodiment.

In one embodiment, application centric view of risk management is utilized. Risk 1102 is analyzed and/or managed not only at user level, but also at cloud level, IP-address level, system level, application level, service level, website level, software level, device level, etc.

One embodiment is related to VRS (Vulnerability Risk Score). Getting risk visibility 1508 in modern infrastructure may be critical for allocating resources and/or responding to incidents (e.g., security incident response 808). Most organizations may be doing things blind. In the embodiment, a framework is built to look at the risk 1102 based on the criticality of different components based on the knowledge across silos (e.g., domain knowledge 1501). System users 904 may enhance and/or contribute based on their needs and requirements of its users. Interface may be constructed by the system users 904 to modify weights. Alert configurations may be constructed by the infrastructure security server 100 based on modified weights of the risk 1102.

In one embodiment, the cloud environment (e.g., virtualized, elastic, dynamic) may call for dynamic access control (e.g., using dynamic privilege adjustment 712) across heterogeneous infrastructure components (e.g., 108A, 108B). The embodiment applies dynamic assessment and/or adjustment of authentication and/or authorization strength as required per the criticality of the workload.

In another embodiment, knowing the impact before and/or after making changes may be critical in the modern infrastructure. The embodiment calculates and/or simulates risk score 210 and/or attack surface, before and/or after the user 104 and/or configuration changes.

In another embodiment, in the modern infrastructure, machine to machine communication and/or east-west traffic (e.g., an Intra-systems traffic in the infrastructure) may present a big attack surface. With more machines and/or associated plug-ins 902, the corresponding plug-ins 902 risk score 210 and/or attack surface may be exponentially increasing. Internet-of-Things (IOT) and/or Big Data trends may present big risk factors also. The embodiment defines, computes and/or analyses risk score 210 and/or manages that risk 1102.

In an embodiment, a system of record (SOR) 610 is constructed for user privileges 1710, user actions (e.g., user activities 1712), plug-in 902 privileges, and plug-in 902 actions, etc. across silos. Adapters may be constructed to collect (e.g., using data collection 902), and/or modify the items in the SOR 610. Software development kit (SDK) 900 may be constructed for custom application. The embodiment may include dynamic privilege management (e.g., using dynamic privilege adjustment 712), policy based automation 606, and/or risk score definition, modeling, computation, analysis, and/or simulation.

In another embodiment, a SOR 610 is constructed for security best practices 1502 knowledge and/or configuration information. Adapters may be constructed to collect (e.g., using data collection 902), and/or modify elements of the SOR 610. SDK 900 may be created for custom applications. The embodiment may include risk score 210, and/or policy-based configuration and/or security profile 1512 compliance.

In another embodiment, a unified frame of authentication (e.g., using identity & authentication server 1702) and/or authorization (e.g., using authorization & management server 1704) is constructed for applications in the modern infrastructure world. Modern applications that run on modern infrastructure may depend on distributed independent heterogeneous infrastructure 710 components (e.g., cloud based services 108A, 108B, and/or authorization systems 112A, 112B). The unified framework across authentication and/or authorization systems may secure and/or enable the modern applications. For example, applications that use containers and/or micro-services may depend on infrastructure on hybrid cloud infrastructure. The unified framework across authentication (e.g., identity & authentication server 1702) and/or authorization (e.g., authorization & management server 1704) may secure and/or enable such applications.

In another embodiment, many current security approaches (e.g., prior art 300) may be reactive and/or preventing data breaches may be a big problem in such approaches. While the machine learning based technologies may possibly predict, the prevention calls for right actions across heterogeneous infrastructure 710 to prevent the actual data breach. The embodiment prevents data breaches by using predictive analytics-driven privilege adjustments (e.g., using machine learning algorithm 212 and/or predictive algorithm 214) and/or risk score calculator (e.g., risk score module 208).

In another embodiment, various plug-ins 902 and/or scripts may be constructed and/or run at specified privilege levels. The system users 904 may initiate time bound scripts to run. The scripts may run at the system privilege level. In the embodiment, the plug-ins 902, the scripts, other application programs and/or other application processes are run at pre-determined privilege level.

Another embodiment is a system and method of restricting the access rights to resources based on the risk score 210. The risk score 210 may be separate from the access privileges 110 given. For example, when the user 104 (e.g., an employee) has a changed status from "on duty" to "on vacation" (e.g., user 104 on vacation at time T3 1136 in FIG. 11), the system admin (e.g., system user 904) may increase his/her risk score 210 based on the activity (and/or non-activity during vacation) (e.g., user activities 1712).

Another embodiment is a system and method to restrict privilege level based on authentication activity of the user 104 (e.g., at the identity & authentication server 1702) such as the authentication context, device, activity pattern, etc. For example, user 104 logging in using a remote device and/or portable computer (e.g., client device 102) in a foreign country may have elevated risk score 210 compared with user login using the desktop computer in the office.

In another embodiment, the risk score 210 is adjusted according to internal factors such as company alert level, system virus detection level, etc. and/or external factors such as network security level, cloud service/application security level, infrastructure security level, national security level.

In another embodiment, a Security Best Practices Automation engine (e.g. execution engine 1514) is constructed to perform at least one of the following:
1. Identify security best practices 1502 for infrastructure (vSphere, OpenStack etc.).
2. Create definitions in the infrastructure for each of these best practices 1502. Call them "Secure Rule Definition" (SRD) 1504.
3. These secure rule definitions 1504 include the rule, violation triggering conditions, and/or remediation actions 1510.
4. For every rule in the SRD 1504, defaults should exist for triggering conditions, and/or remediation actions 1510.
5. Provide the ability for the system user 904 to create new SRDs 1504.
6. Provide the ability for the system user 904 to modify any existing SRDs 1504.
These modifications should create new SRDs 1504 specific to the system user 904.
7. Find any SRDs 1504 that conflict with each other, and/or flag them.
8. Group SRDs 1504 to create a "Security Profile" (SP) 1512.
9. Do not allow the system user 904 to add two conflicting SRDs 1504 to the same SP 1512.
10. Provide the ability for the system user 904 to create, and/or modify SPs 1512.
11. Provide the system user 904 with the ability to share SRDs 1504, and/or SPs 1512 with others via some network (e.g., social network).

The embodiment may include remediation actions 1510 which include at least one of the following:
1. AutoFix—Automatically fix violations.
2. AutoFix With Notification—Automatically fix violations, and/or notify the administrators (including the system user 904 that made the change that caused the violation trigger, and/or any other optional users).
3. AutoFix With TTL (time to live)—Set a timer for the AutoFix to kick in, from the point of violation trigger.
4. Scheduled AutoFix—Send a notification to the administrator about the violation, and/or provide a way to schedule AutoFix for the violation.
5. ManualFix With Notification—Send a notification to the administrator about the violation, and/or provide a link to fix it.

The embodiment may include at least one of the following steps:
1. Create a default SP 1512 (SP 1512 contains system defined SRDs 1504).
2. Security best practices automation is done using a SP execution engine 1514, at regular frequency (every hour).
3. The system user 904 can create custom SPs 1512, and/or add those SPs 1512 (providing a priority order for the SPs 1512) for assessment. The system checks for all SPs 1512 in the priority order specified. Notify the system user 904 if there are any conflicting SRDs 1504 in the SPs 1512.
4. Provide at least one default SP 1512. For example, HighSP, ModerateSP, MinimumSP. The system user 904 can create any number of custom SPs 1512. The system user 904 can start from a default SP 1512, and/or from nothing to create custom SP 1512 like CustomSP1, CustomSP2, etc.
5. Provide a SP Execution Engine 1514 to automatically execute the SRDs 1504 specified in each of the active SPs 1512.

The SRD 1504 may include at least one of the elements
1. id
2. name
3. description
4. configPropertyMap (key=config property name, value=config property value)
5. triggerConditionSet
6. remediationSet A remediation 1510 may include at least one of the elements:
1. id
2. name
3. description
4. action The SP 1512 may include at least one of the elements
1. id
2. srdSet In another embodiment, the RS (risk score) 210 is constructed as a number indicating the security vulnerability risk 1102. The RS 210 is computed based on the privileges the user 104 is entitled to, a user context (e.g., 1200A, 1200B) and/or a user behavior, and/or security best practice violations with infrastructure configuration.

The risk score 210 may also be computed for other granularity such as a privilege, an action, an operation, a software, an application, a device, a component, a machine, a system, a network, a server, a client, a cloud device, a cloud service, an infrastructure, a role, a task, a job, a function, a project, a group, a company, an enterprise, a country, etc., according to one embodiment.

The user 104 may be interpreted as any user, service account, any program and/or script requiring some privileges to perform an action. The risk score 210 may be computed for each of these, and/or aggregated for any of these constituents, according to one embodiment.

The user 104 in this context (e.g., 1200A, 1200B) may be the user 104 providing, and/or operating the infrastructure to run applications (infrastructure operator). In the infrastructure world, the vulnerability risks 1102 may emanate from many dimensions like configuration (e.g., application data access config 1602, modify config 1604, and/or read config 1606), excessive privileges (e.g., user privilege 1710), user context (e.g. 1200A, 1200B), and/or behavior etc., according to one embodiment.

Infrastructure configuration (e.g., application data access config 1602, modify config 1604, and/or read config 1606) may play a major role in determining the operational security. The majority of the user operations (e.g., user activities 1712) may fall into either provisioning and/or monitoring categories. Each of these major categories may require many privileges (e.g., user privileges 1710).
  a. Provisioning: Privileges needed to provision new resources to run applications may include at least one of:
    i. Create new resources (e.g., create new configuration objects)
  b. Monitoring (e.g., using the monitor module 202): Privileges needed to be monitored (e.g., using the monitor module 202) and/or adjusted in the infrastructure configuration, including at least one of:

i. Config read: Read any configuration parameters.
ii. Config modify: Create/update/delete any configuration parameters, thereby update/delete resources.
iii. Access to application data:
1. Read data: User 104 can access the application data.
2. Update data: User 104 can modify the application data.
3. Delete data: User 104 can delete the application data.

There may be many security best practices 1502 for infrastructure configuration, and/or some of them may be published and/or shared. The customers may start off with following all the published security best practices 1502. Over time, configuration drift may creep in for many reasons (troubleshooting may be the primary culprit). This may result in increased risk 1102 for security breach, according to one embodiment.

There may be hundreds of fine grained privileges (e.g., user privilege 1710) defined for operational processes for most of the infrastructures in the world. The state of the art may aggregate groups of privileges into roles (e.g., associated with role privileges 1708), and/or assign them to a user 104 as permissions (e.g., user permissions 1706). Over time, the administrator (e.g., system user 904) may grant more privileges than the user 104 actually requires, since there may be no easy way to grant only the required fine grained privileges. This may result in increased risk (e.g., 1102) for security breach, according to one embodiment.

In one embodiment, a multi-dimensional risk score 210 computation for dynamic and/or virtual infrastructure is performed. We need a single metric to measure this risk 1102. Risk Score (RS) 210 is that metric.

$$RS=EPRS+CVRS+CVERS+CUSTOM$$

where EPRS=Excessive Privilege Risk Score $$EPRS=f[up]=nu \times [nrc+[2 \times nmc]+[2 \times nada]]$$

up=user privileges
nu=number of users
nrc=number of read config privileges
nmc=number of modify config privileges
nada=number of application data access privileges
Input: number of users 104, number of read config 1606 privileges, number of modify config 1604 privileges, number of application data access 1602 privileges
Output: vulnerability risk score
Logic: The aforementioned formula conveys the logic
and CVRS=Configuration Violations Risk Score $$CVRS=f[scv]=[2 \times nscv]$$

scv=security configuration violations
nscv=number of security best practice config violations
Input: number of security best practice config violations
Output: vulnerability risk score
Logic: The aforementioned formula conveys the logic
and CVERS=Common Vulnerabilities and Exposures Risk Score $$CVERS=f[cve]=[10 \times ncve]$$

cve=Common Vulnerability Exposure Database
ncve=number of applicable CVEs
Input: Number of applicable CVEs from the CVE Database
Output: vulnerability risk score
Logic: The aforementioned formula conveys the logic
and $$CUSTOM=f[x]=[n]$$

x=Function of applications, open source tools etc.
n=number of entities that are susceptible to this.
Input: Number of entities that are susceptible to this.
Output: vulnerability risk score
Logic: The aforementioned formula conveys the logic One with skill in the art will appreciate that this is just one embodiment (e.g., simple linear functions). More diverse non-linear functions may be contemplated to provide support for more general expressions (e.g., involving polynomials, logs, exponentiation, min/max thresholds, etc.).

The Risk Score (RS) 210 may be multi-dimensional because it can be computed across heterogeneous infrastructure 710. For example, we can look at RS from three dimensions: a dimension of user privileges 1710/user activities 1712, a second dimension of user context (e.g., 1200A, 1200B) and/or behavior, and/or a third dimension of infrastructure configuration, according to one embodiment.

In another embodiment, risk score 210 is analyzed with a number of Risk Depiction Infographics, including periodic risk score 210 plots (e.g., hourly, daily, weekly, monthly, quarterly) with granularity ranging from individual users 104, groups, departments, operations, tasks, functions, roles, projects, companies, enterprises, infrastructure, regions, zones, etc. In particularly, individual users 104 are analyzed.

In one embodiment, the capabilities of users 104 (e.g., associated with user permissions 1706) may be based on their entitled privileges (e.g., user privileges 1710). In the case of a sizable number of users 104, maintaining the users 104 and/or their privileges (e.g., user privileges 1710) manually may be time consuming, and/or may be perceived as a productivity inhibitor. In the embodiment, "Just Enough Privileges" (JEP) (e.g., qualified privileges or special privileges) 1002 is automatically created and/or maintained for users 104 to reduce/minimize the risk 1102 without sacrificing the productivity.

In one embodiment, the risk score (RS) 210 is constructed such that the infrastructure configuration plays a major role. The vulnerability assessment of infrastructure configuration and/or weighing against the user privileges 1710 is the ultimate RS goal. As part of the RS, a critical asset discovery (identified with help of user 104 and/or system (e.g., infrastructure security server 100, authorization server 1704)) is used. The vulnerability assessment (VA) of the critical assets may be done by the existing tools like Nessus. The embodiment adds the configuration of the critical infrastructure into this assessment, which are missing and/or hard-to-deliver features in the existing VA tools.

In one embodiment, since the focus is on the dynamic cloud infrastructure, the relationship graph is used and/or is to play a major role. The VA because of interdependent assets is calculated. The potential risk 1102 path may be given to critical information/asset so that system admins (e.g., system user 904) may understand the possible hacker threats.

In another embodiment, if the users 104 have high privileges, the security measures to be applied include strong authentication (e.g., biometric-based authentication and/or SMS confirmation in addition to password checking), etc. A security info may be enforced. Strong authentication may be applied to critical assets and/or users 104 to lower the risk 1102. Detectable security holes may be quantified and/or included as part of RS 210.

In one embodiment, infrastructure configuration against the best practices 1502 is another factor for RS 210. For implementation, we may bring a framework in which any SP 1512/SRDs 1504 of vendors and/or customers may be added for an engine (e.g., execution engine 1514) that may take care for the CVA (cyber vulnerability assessment).

Infrastructure configuration against the CVE (common vulnerabilities and exposures) 1503 databases is very important. In the embodiment, we construct a framework that quantifies and/or integrates the relevant CVEs 1503 into effect with minimal time lag before the hackers can exploit, according to one embodiment.

In one embodiment, as a second step in RS 210, we consider the critical information (configuration info of assets, people, data) and/or safeguard them.

In another embodiment, risk exposure 1102 (e.g. risk score 210) is adaptively determined based on at least one of the following:
  a. Unpatched and/or unpatchable applications, OS, devices. One example is Windows® 2003 servers which Microsoft® stopped supporting, and/or there is no more OS security updates happening. Another example is devices—printers, routers that are connected but not getting the updates/patches.
  b. Third party service providers (or contractors) with remote access. Some high profile and/or extremely expensive breaches (perhaps Home Depot, Target, etc.) may be due to contractor's login credentials being stolen.
  c. Proper segmentation of secure and/or less secure systems.
  d. Identifying disgruntled and/or terminated employees having access. For example, some big company hack may not be done by terrorists but by an insider.
  e. Careless and/or uninformed employees.

In one embodiment, open source risk exposure 1102 may be very crucial as hackers may even look at the source code to identify the vulnerabilities. Even the developer hackers may introduce intentional vulnerabilities. Openstack® cloud may have vulnerabilities also (e.g., Openstack® clouds that do not use transport layer security (TLS) may be vulnerable). The embodiment analyzes the open source risk exposure 1102 and/or any intentional vulnerabilities and/or adjusts the access privilege 110 accordingly to control security exposure and/or risk 1102.

In another embodiment, Policy Based Automation 606 is constructed to assign Just Enough Privileges (JEP) 1002 (e.g., qualified privileges or special privileges) to users 104. To remove unused/unnecessary privileges, the embodiment may perform at least one of the following:
 1. Find all the permissions (e.g., user permissions 1706, role privileges 1708, role ACLs (access control list), etc.).
 2. Find the operations (e.g., in user activities 1712) performed by all users 104 from the entire history.
 3. For each user 104, analyze the operations performed by the user (e.g., privilege usage patterns 1714 in user activities 1712).
 4. Using machine learning prediction algorithms (e.g., machine learning algorithm 212, predictive algorithm 214), find the operations likely to be performed by the user 104 frequently (on a weekly basis, and/or at some frequency).
 5. Find the required privileges for operations identified in step 4.
 6. Create a unique role specific to the user (e.g., create new user specific role with the new privileges 1806) containing the privileges (e.g., user privileges 1710) identified in step 5.
 7. Update user permission 1706 with the newly created role (e.g., created in 1806), created in step 6 to the specific user.
 8. Remove any other roles assigned to the user 1814.

To request a new privilege 110 for a specific user 104, the embodiment may perform at least one of the following:
 1. Identify the privilege 110.
 2. Make sure that the user 104 is assigned a unique role (as in 1806), created specifically for that user 104.
 3. If the user 104 does not have a unique role (e.g., 1802), follow the steps 3 to 7 in the above steps to create a unique role (e.g., 1806).
 4. Update the role (e.g., associated with role privileges 1708) with the new privilege 1808 using any of the workflows.
   a. Request permission to add the new privilege via some notification, with the ability to approve/deny the request within the notification. Provide the ability to set TTL (time to live) for the new privilege.
   b. Create a set of privileges that can be automatically approved (e.g., privileges auto approved upon recent usage 1106). If the requested privilege is one of them add that privilege automatically, and/or send notification.

The embodiments of this disclosure are illustrated by way of example and not limitation in the Figures of the accompanying drawings, in which like references indicate similar elements and in which:

FIG. 1 is a network view of an infrastructure security server 100 authenticating a user 104 authorized to access a set of heterogeneous cloud-based services (e.g., 108A, 108B) using an authorization system 200, according to one embodiment.

Particularly, FIG. 1 illustrates an infrastructure security server 100, a client device 102, a user 104, a cloud infrastructure 106, a set of heterogeneous cloud-based services (e.g., 108A, 108B), an access privilege 110, and/or a network 112, according to one embodiment.

The infrastructure security server 100 may serve a user 104 of the client device 102 authenticated to be the user 104 authorized to access the set of heterogeneous cloud-based services (e.g., 108A, 108B) using the authorization system 200. The infrastructure security server 100 may monitor (e.g., using the monitor module 202) the activity of the user (e.g., user activities 1712) accessing (e.g., using access privilege 110) the set of heterogeneous cloud-based services (e.g., 108A, 108B) over a period of time using a processor 204 and a memory 206 of the client device 102 through the network 112. The cloud infrastructure 106 may include all aspects of IT (e.g., physical servers, physical storage, physical network, virtual machines, virtual servers, virtual storage, virtual network, containers, private cloud, public cloud, hybrid cloud, other clouds, applications, devices, IaaS, PaaS, SaaS, etc.) that are needed to support the computing requirements of a cloud computing model of the set of heterogeneous cloud-based services (e.g., 108A, 108B). In addition, cloud infrastructures 106 may include a software abstraction layer that virtualizes resources and/or logically presents them to users 104 of the infrastructure security server 100 through programmatic means, according to one embodiment.

FIG. 2 is an exploded view 250 of the infrastructure security server 100 of FIG. 1, according to one embodiment.

Particularly, FIG. 2 builds on FIG. 1 and further adds, an authorization system 200, a monitor module 202, a processor 204, a memory 206, a risk score module 208, a risk score

210, a machine learning algorithm 212, and a predictive algorithm 214, according to one embodiment.

The infrastructure security server 100 may monitor (e.g., using the monitor module 202) and/or control the user's access to privileges dynamically (e.g., using dynamic privilege adjustment 712) based on user activities 1712 (including the usage of privileges) in the cloud-based environment (e.g., cloud infrastructure 106) with heterogeneous authentication systems 910 and authorization systems 200 (e.g., computers with various operating systems and/or access protocols). The authorization system 200 may monitor the user activity 1712 over a period of time using the monitor module 202. The time period may be a long time (e.g. a window of 50 years from time of employment), and/or it may be relatively short (e.g., a window of 3 months for a temporary staff, and/or a window of 1 day for a guest user). The risk score module 208 of the infrastructure security server 100 may be utilized to calculate the risk score 210 that may be a combination of an excessive privilege risk score, a configuration violation risk score, a common vulnerabilities risk score, an exposure risk score, and/or a custom risk score. The infrastructure security server 100 may utilize the machine learning algorithm 212 to find an operation likely to be performed by the user 104 on a frequent basis, according to one embodiment.

The predictive algorithm 214 of the infrastructure security server 100 may be utilized by the authorization systems 200 to predict which operation is likely to be performed to form a prediction, according to one embodiment.

Figure 3:
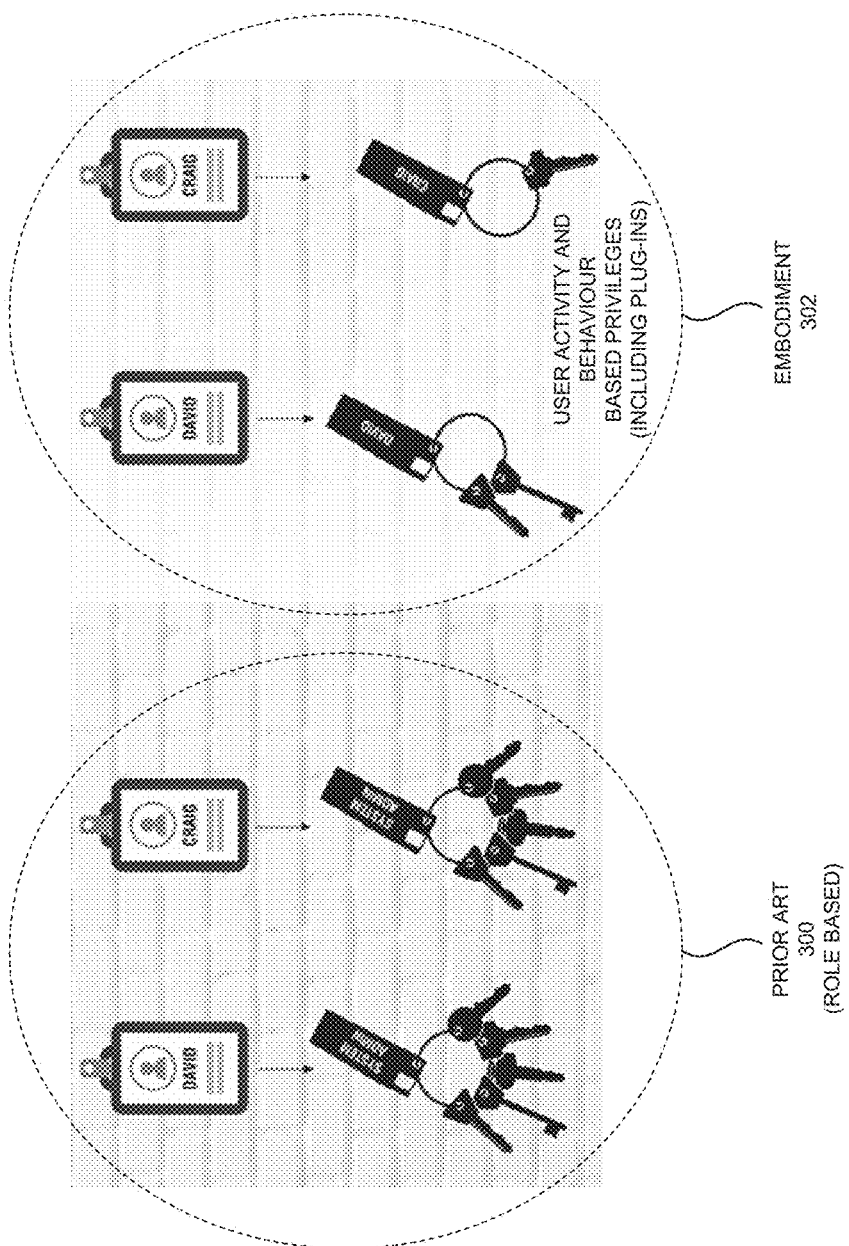
FIG. 3 is an example embodiment of adjustment of an access privilege to a user by an administrator of an organization based on the monitoring of the activity of the user over the period of time by the infrastructure security server of FIG. 1, according to one embodiment.

FIG. 3 is a comparison embodiment of access privilege adjustment by the prior art 300 and by the infrastructure security server 100 of FIG. 1, according to one embodiment. Particularly, FIG. 3 builds on FIGS. 1 and 2, and further adds, a prior art (role based privilege) 300 and embodiment (e.g., user activity/behavior based privilege 1710) 302, according to one embodiment.

In the prior art 300, users David and Craig may both be system administrators (e.g., system user 904) and both have comprehensive set of keys (e.g., access privileges 110) to access multiple services across multiple heterogeneous authorization systems (e.g., authorization system 200). But between David and Craig, there may be division of labor such that none of David and Craig use the full set of keys (e.g., access privileges 110). Different personal style and preference may lead David and Craig to use different keys (e.g., access privilege 110 to different operations and/or resources) to achieve their tasks. In the example in FIG. 3, David may use only 2 out of the 5 keys available to him. Craig may use only 1 out of the 5 keys available to him. The unused keys may not be needed for David's and Craig's daily duties. Such unused keys may be revoked from David and Craig without affect their daily activities, and yet may limit the worst case security damage in the unfortunate event of their accounts being compromised. The embodiment 302 of infrastructure security server 100 monitors (e.g., using the monitor module 202) the activity (e.g., user activities 1712) and behavior of David and Craig and dynamically adjusts (e.g., using dynamic privilege adjustment 712) their access privileges (e.g., user privileges 1710) to remove any unused keys (e.g., user privileges 1710). The dynamic adjustment (e.g., using dynamic privilege adjustment 712) may be based on some security policy (e.g., privilege management policies 1716), security rule definitions (SRD) 1504, and/or security profile 1512. The dynamic adjustment of privileges (e.g., using dynamic privilege adjustment 712) including maintaining existing privilege (e.g., privilege assigned due to usage 1112), granting user request for privilege (e.g., privilege auto assigned upon recent usage 1106, and/or privilege assigned upon approval 1110), revocation of privileges (e.g., privilege unassigned due to recent non-usage 1108) may be based on the monitored activities (e.g., user activities 1712) of the David and Craig using some risk scores 210 computation based on the monitored activities (e.g., user activities 1712), according to one embodiment.

The infrastructure security server 100 applies plug-ins 902 to various authorization systems (e.g., 112A and 112B) and collects (e.g., using collection 902) lists of privileges from them. The authorization systems (e.g., 112A and 112B) may perform operations to various services (e.g., cloud based service 108A and 108B) and resources. The monitored activities, behaviors, privileges, derived information for privileges (e.g., using derivation 902) may be transformed (e.g., using transformation 902) using a common privilege information model 906 to become normalized so that they may be understandable to and/or analyzed by the infrastructure security server 100, according to one embodiment.

Best practices 1502 of setting the security policy (e.g., privilege management policies 1716), security rule definition 1504 and/or security profile 1512, derived information for privileges (e.g., using derivation 902), and the risk score 210 computation (e.g., using risk score module 208), may be stored, retained, analyzed, transformed, transferred, cloned, and/or copied, according to one embodiment.

The policy based automation module 606 of the infrastructure security server 100 may enable an administrator (e.g., system user 904) responsible for security of access the set of heterogeneous cloud-based services (e.g., 108A, 108B) to automatically adjust a privilege of the user (e.g., one of user privileges 1710) based on the role (e.g., associated with role privileges 1708) of the user 104 in the organization as shown in prior art (role based privilege) 300. Further, the privilege of the user 104 may be automatically adjusted by the administrator (e.g., system user 904) based on the user activities 1712 and behavior as shown in the embodiment 302, according to one embodiment.

Figure 4:
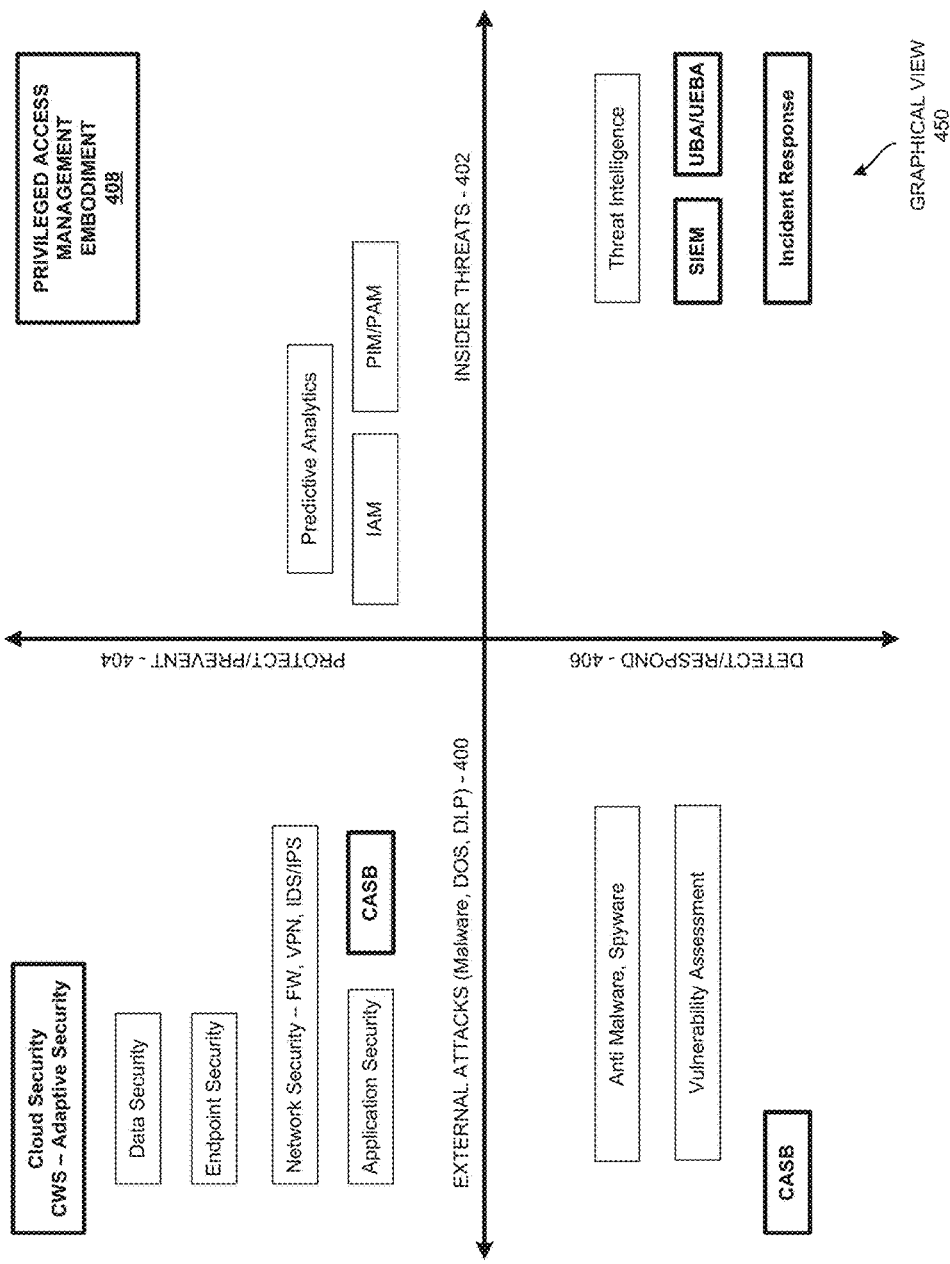
FIG. 4 is a graphical view illustrating the privileged access management of the infrastructure security server of FIG. 1, according to one embodiment.

FIG. 4 is a graphical view 450 illustrating a privileged access management of the infrastructure security server 100 of FIG. 1, according to one embodiment. Security systems may need to address problems ranging from external attacks 400 to insider threats 402. Response to problems may range from detect/respond 406 (e.g., anti-malware, anti-spyware, vulnerability assessment, CAS, threat intelligence, SIEM, UBA/UEBA, incident response) to protect/prevent 404 (e.g., cloud security CWS, CASB, data security, endpoint security, FW, VPN, IDS/IPS, application security, predictive analytics, IAM, PIM/PAM). The proposed access privilege management embodiment 408 may be a method, apparatus and system under protect/prevent 404 (e.g., "protection and prevention against insider threats"), according to one embodiment.

Particularly, FIG. 4 builds on FIGS. 1, 2 and 3, and further adds, an external attacks (e.g., malware, DOS, DLP) 400, an insider threat 402, a protect/prevent 404, detect/respond 406, and an access privilege management embodiment 408, according to one embodiment.

In the embodiment, the access privilege management (e.g., using privilege adjustor 1718) of the infrastructure security server 100 may prevent data breaches (e.g., external attacks 400, insider threats 402) by using protect/prevent 404 by allowing running plug-ins 902, scripts at specified privilege level and/or other application programs, processes at pre-determined privilege level, restricting the access rights to resources based on the risk score 210 and/or restricting privilege level based on authentication activity.

The access privilege management embodiment 408 may include preventing insider threats 402 using predictive analytics (e.g., IAM, PIM/PAM), vulnerability assessment by using detect/respond 406, and/or protect/prevent 404 external attacks by using adaptive security of the infrastructure security server 100.

Figure 5:
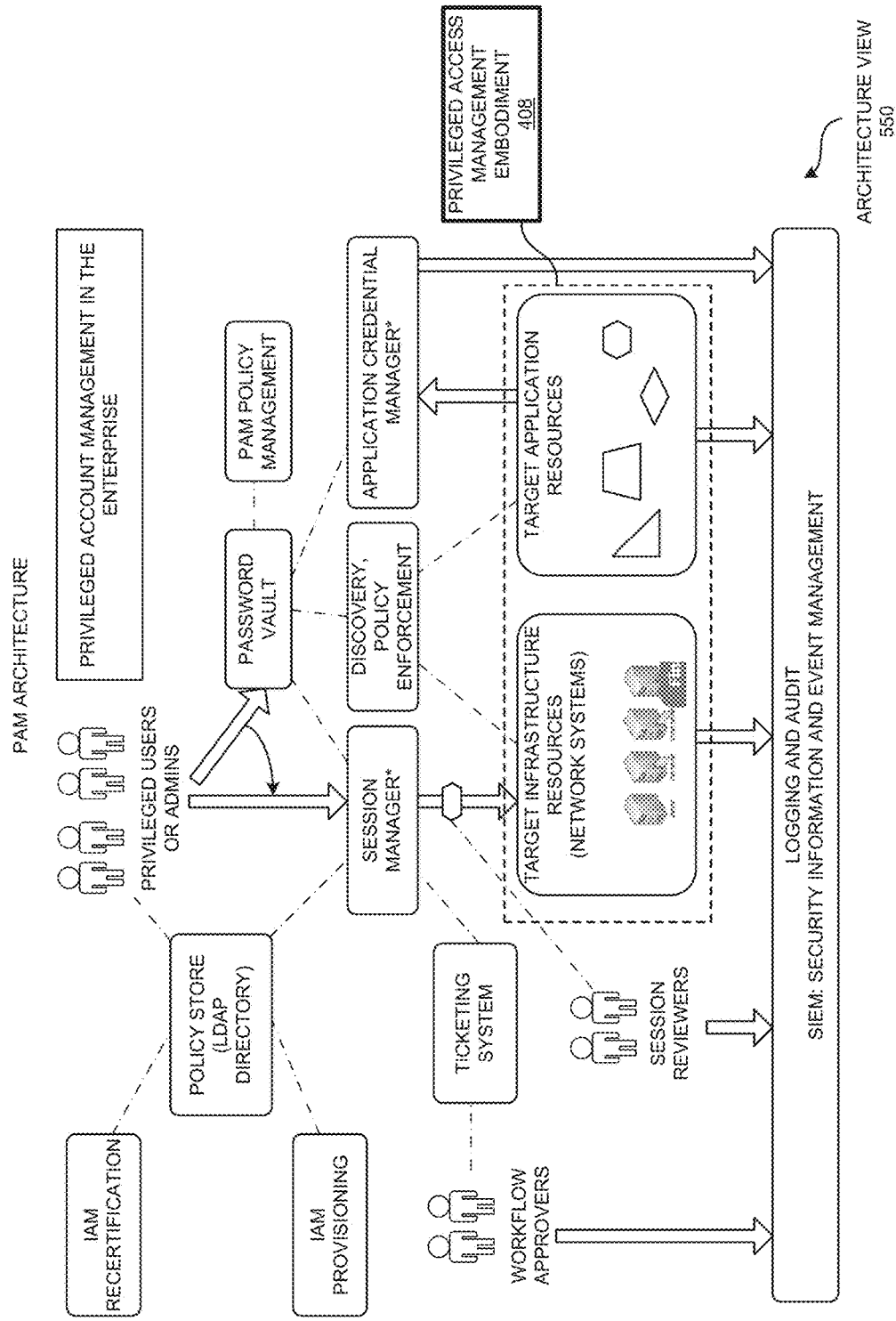
FIG. 5 is an architecture view illustrating the privileged account management in an enterprise using the infrastructure security server of FIG. 1, according to one embodiment.

FIG. 5 is an architectural view 550 illustrating an privileged access management (PAM) architecture and the role of the infrastructure security server 100 of FIG. 1 in PAM, according to one embodiment. It shows the components of an overall security architecture of a company and/or institution. In the overall architecture, the privileged access management embodiment 408 of the infrastructure security server 100 includes the target infrastructure resources (network systems) and the target application resources.

Figure 6:
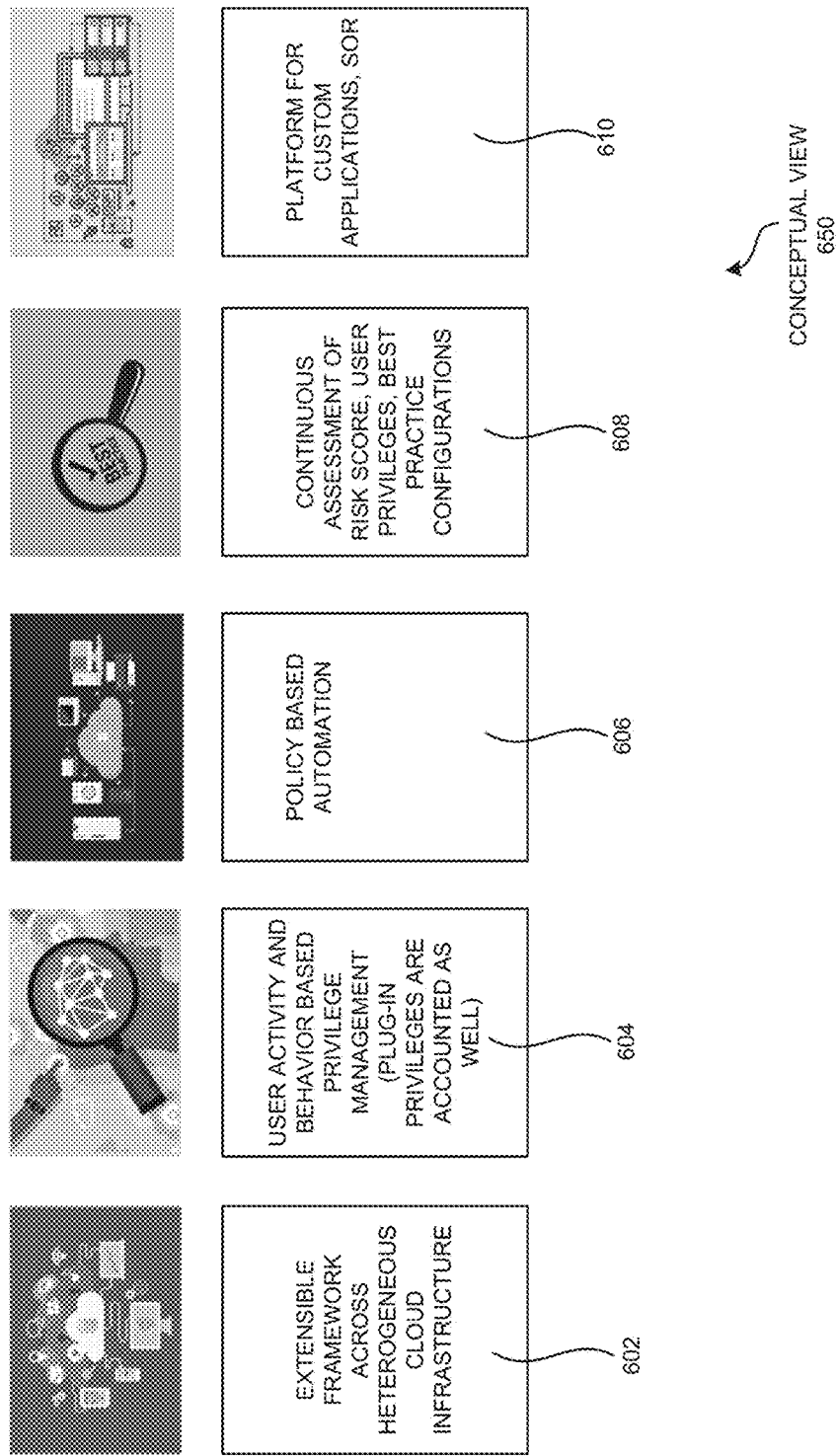
FIG. 6 is a conceptual view of the infrastructure security server of FIG. 1, according to one embodiment.

FIG. 6 is a conceptual view 650 of the infrastructure security server 100 of FIG. 1, according to one embodiment. The infrastructure security server 100 of FIG. 1 provides an extensible framework across heterogeneous cloud infrastructure 602, a user activity and behavior based privilege management 604, a policy based automation 606, an "assessment of risk score 210, user privileges 1710 and best practice 1502 configurations" 608, and a platform for custom applications SOR 610, according to one embodiment.

The policy based automation 606 of the infrastructure security server 100 may enable identifying security best practices 1502 for infrastructure, create secure rule definitions (SRD) 1504 for each of these best practices 1502. The secure rule definitions (SRDs) 1504 may include the rule, violation triggering conditions, and remediation 1510 actions. The remediation 1510 actions may automatically fix violations and/or notify the system users (e.g., including system user 904 that made the change that caused the violation trigger, and/or any other optional users), according to one embodiment.

The system of the infrastructure security server 100 may provide the ability for the system user 904 to create new SRDs 1504 and/or the ability for the system user 904 to modify any existing SRD 1504. These modifications may create new SRD 1504 specific to the system user 904, according to one embodiment.

Figure 7:
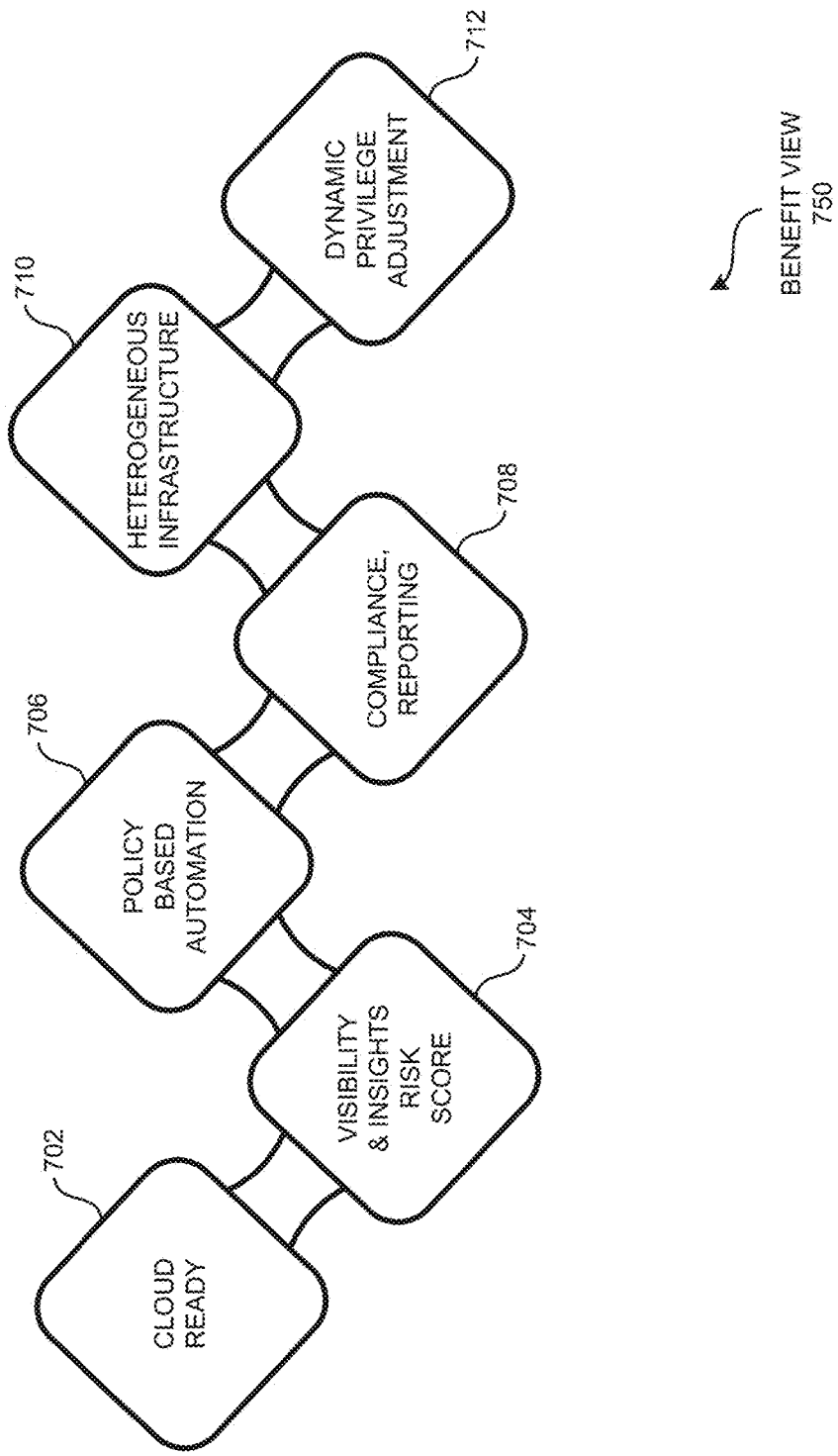
FIG. 7 is a benefit view of the infrastructure security server of FIG. 1, according to one embodiment.

FIG. 7 is a benefit view 750 of the infrastructure security server 100 of FIG. 1, according to one embodiment. Particularly, FIG. 7 builds on FIG. 1 through 6, and further adds, a cloud ready 702, a visibility and insights risk score 704, a policy based automation 606, a compliance reporting 708, a heterogeneous infrastructure 710, and a dynamic privilege adjustment 712, according to one embodiment.

The visibility and/or insights risk score 704 of the infrastructure security server 100 may give enough insight to the administrator (e.g., system user 904) of an organization to assign just enough privileges 1002 to the user 104 according to the user 104 daily duties and/or activities. The use of the infrastructure security server 100 system may enable an enterprise to function using a wide array of servers running on a vast range of operating systems (e.g., using heterogeneous infrastructure 710). The compliance reporting 708 of the infrastructure security server 100 may be configured to ensure compliance with relevant laws and/or regulation of organization goals, according to one embodiment.

Figure 8:
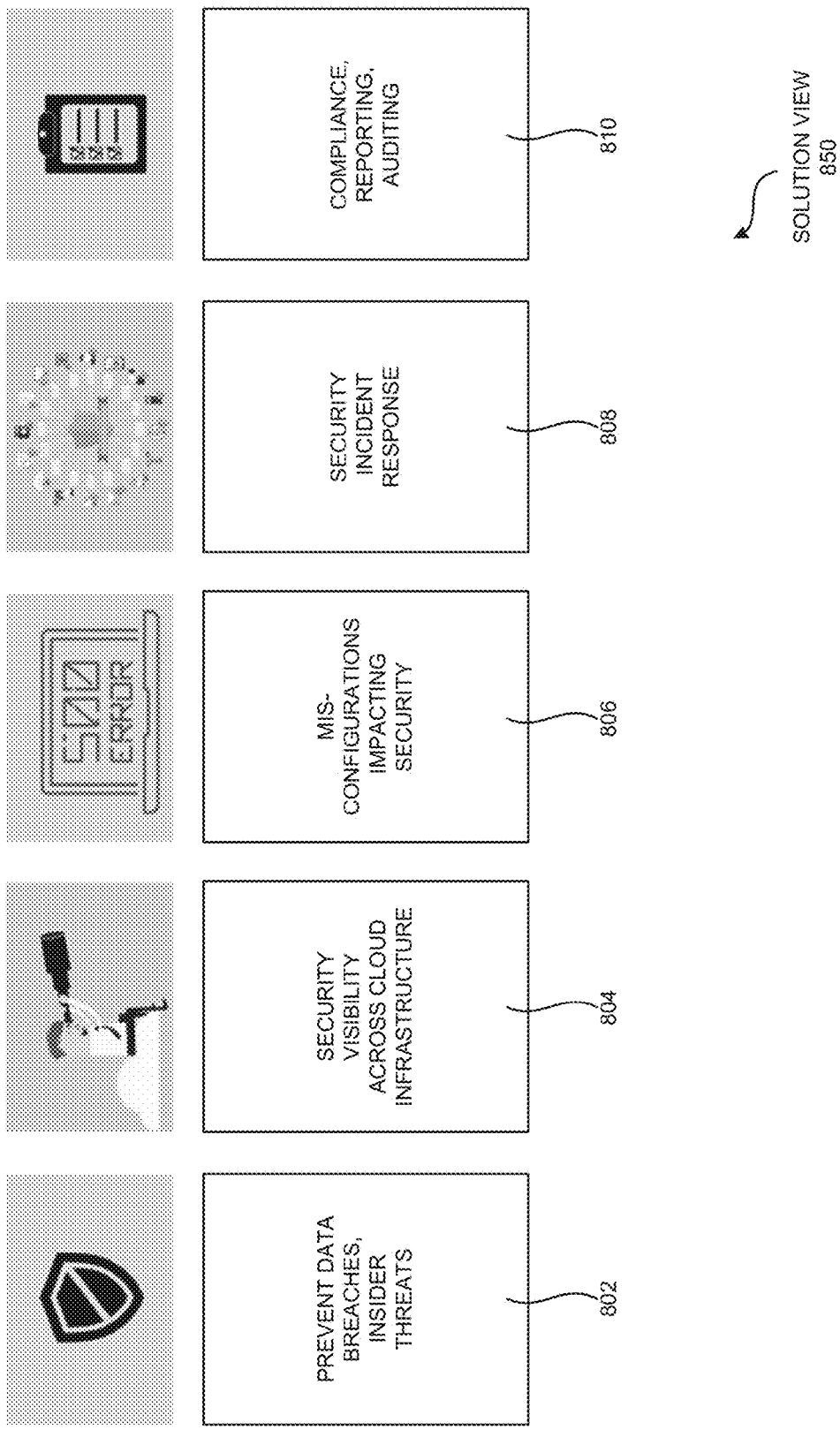
FIG. 8 is a solution view of the infrastructure security server of FIG. 1, according to one embodiment.

FIG. 8 is a solution view 850 of the infrastructure security server 100 of FIG. 1, according to one embodiment. Particularly, FIG. 8 builds on FIG. 1 through 7, and further adds prevent data breaches 802 from insider threats 402, security visibility across cloud infrastructure 804, a misconfigurations impacting security 806, a security incident response 808, and/or a compliance reporting auditing 810, according to one embodiment.

The infrastructure security server 100 allows prevention of data breaches 802 from insider threats, security visibility across cloud infrastructure 804, prevents misconfigurations impacting security 806 of the enterprises using cloud based services 108, prepares security incident responses 808, and/or compliance reporting auditing 810 of the enterprise, according to one embodiment.

Figure 9:
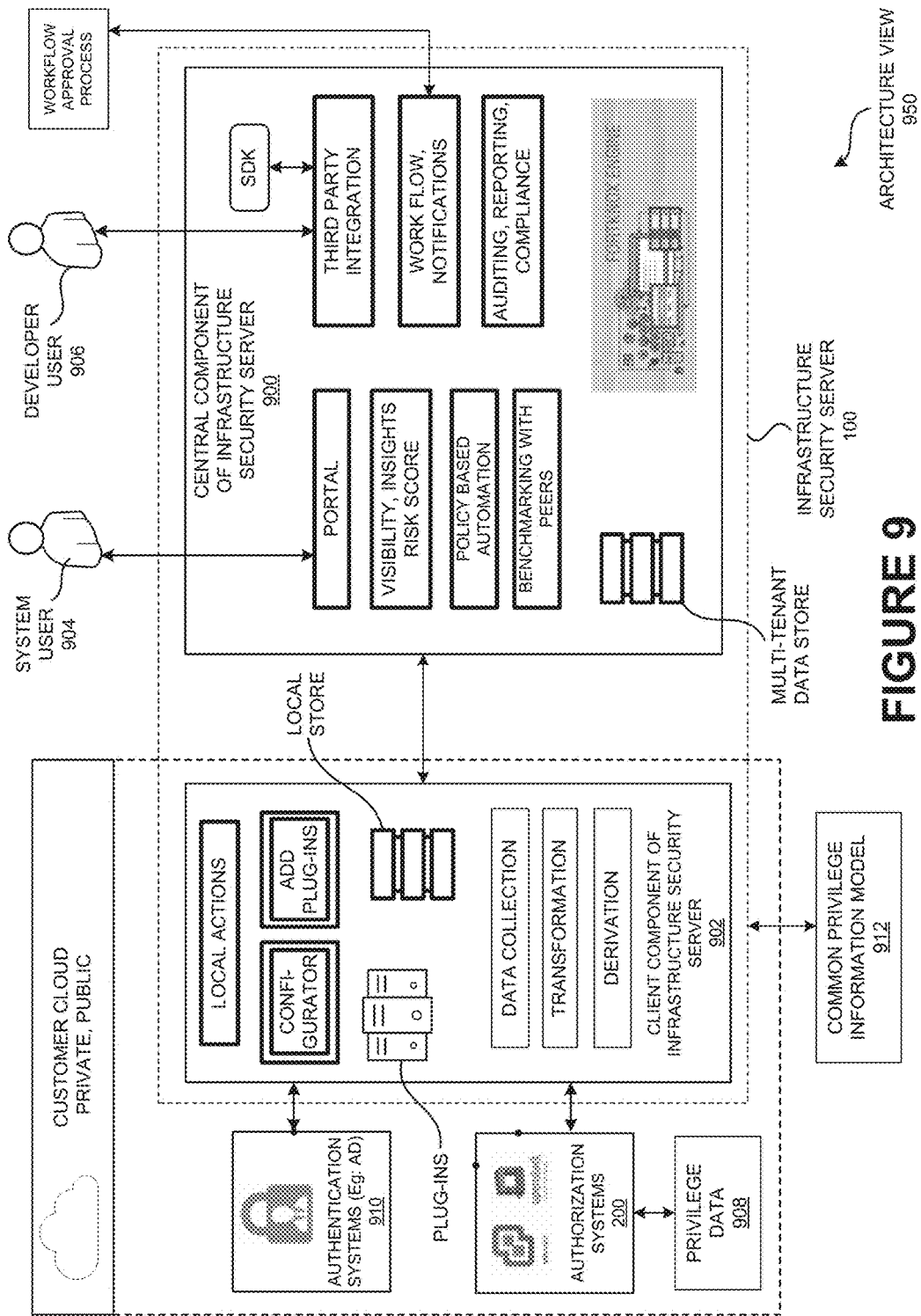
FIG. 9 is an architecture view illustrating an example embodiment of implementing an activity based access control of the infrastructure security server of FIG. 1 in a private and/or public cloud infrastructure environment, according to one embodiment.

FIG. 9 is an architecture view 950 illustrating an example embodiment of implementing an activity based access control (e.g., using user activity and behavior based privilege management 604) of the infrastructure security server 100 of FIG. 1 in a private and/or public cloud infrastructure environment, according to one embodiment.

The infrastructure security server 100 has two major components: a central component of infrastructure security server 900 and a client component infrastructure security server 902 communicatively coupled to the central component of infrastructure security server 900. The central component of infrastructure security server 900 resides in a server machine/system, while the client component of infrastructure security server 902 resides in an authorization system 200. There may be many instances of the client components of infrastructure security server 902 running in the cloud infrastructure 106, with each instance coupled to an authorization system (e.g., 112A or 112B) through a plug-in 902, wherein the authorization system 200 may be associated with at least one cloud based service 108, according to one embodiment.

The central component of the infrastructure security server 900 may have portals for system users 904 (e.g., system administrator, special users) to configure and maintain the infrastructure security server 100, and to monitor (e.g., using the monitor module 202) users 104. The central component of infrastructure security server 900 monitors (e.g., using the monitor module 202) the activity and behavior of user 104 over a period of time. It dynamically adjusts (e.g., using dynamic privilege adjustment 712) the user's access privileges 1710 to at least one heterogeneous cloud-based service (e.g., 108A, 108B) based on security rule definitions (SRD) 1504, and/or security profiles (SPs) 1512 using a policy based automation 606. The central component of infrastructure security server 900 also computes the risk scores 210 and analyses the risk 1102 at any granularity. It also provides visibility 1508 and insights of the risk score 210 analysis, and allows benchmarking with peers. It provides work flow and notifications. It supports auditing, reporting and compliance. It has a multi-tenant data store. The infrastructure security server 100 allows its security settings to be configured and/or modified by the system user 904 including policy based automation 606 (e.g., using rules, policies and profiles) to grant/revoke privileges. The central component of the infrastructure security server 900 may have a third party integration module with an SDK for developer users 906 to develop applications, according to one embodiment.

The client component of infrastructure security server 902 uses a plug-in 902 to communicate with an authorization system 200. It obtains privilege data 908 from the authorization system 200. It collects data (e.g., using data collection 902) from the authorization system 200 in the cloud. It performs transformation 902 and transforms the collected data (e.g., obtained using data collection 902) into a normalized form (e.g., conforming to common privilege information model 912) for the client component of infrastructure security server 902. It performs derivation 902 and computes derived information (e.g., using derivation in 902). It performs local actions and other actions also. The client component of infrastructure security server 902 communicates with the central component of infrastructure security server 900, according to one embodiment.

Figure 10:
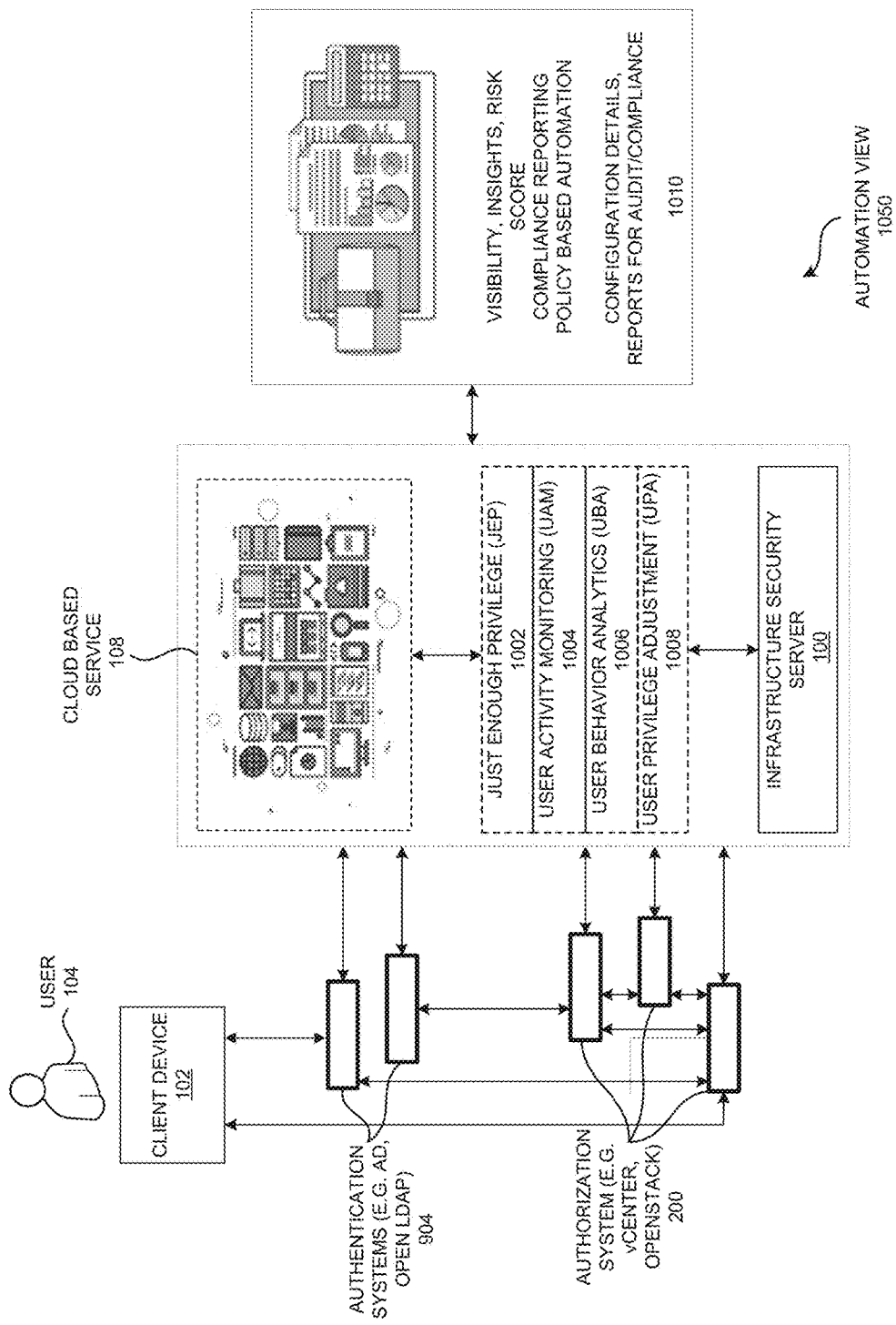
FIG. 10 is an automation view of the infrastructure security server of FIG. 1 in a private and/or public cloud infrastructure environment, according to one embodiment.

FIG. 10 is an automation view 1050 of the infrastructure security server 100 of FIG. 1 in a private and/or public cloud infrastructure environment, according to one embodiment.

In the embodiment, the user 104 uses the client device 102 to access an authentication system 910 (e.g., Active Directory (AD), Open LDAP). The user 104 is authenticated to be authorized to access a set of heterogeneous cloud-based services (e.g., 108A, 108B) using at least one authorization system 200 (e.g., vCenter, OpenStack). The infrastructure security server 100 performs user activity monitoring (UAM) 1004 (e.g., using the monitor module 202), user behavior analysis using user behavior analytics (UBA) 1006, and user privilege adjustment (UPA) 1008 based on the monitored user activities 1712 and user behavior analysis. It maintains just enough privileges (JEP) 1002 (e.g., qualified privileges or special privileges) for the user 104 to access the cloud based services (e.g., 108A, 108B) to do the user's daily duties and tasks while maximizing security. It provides visibility 1508, insights 1010 and risk score 210 computation (e.g., using risk score module 208) and analysis 1010. It operates a policy based automation 606. It provides compliance reporting 1010, configuration details 1010 and reports for audit/compliance 1010.

Figure 11:
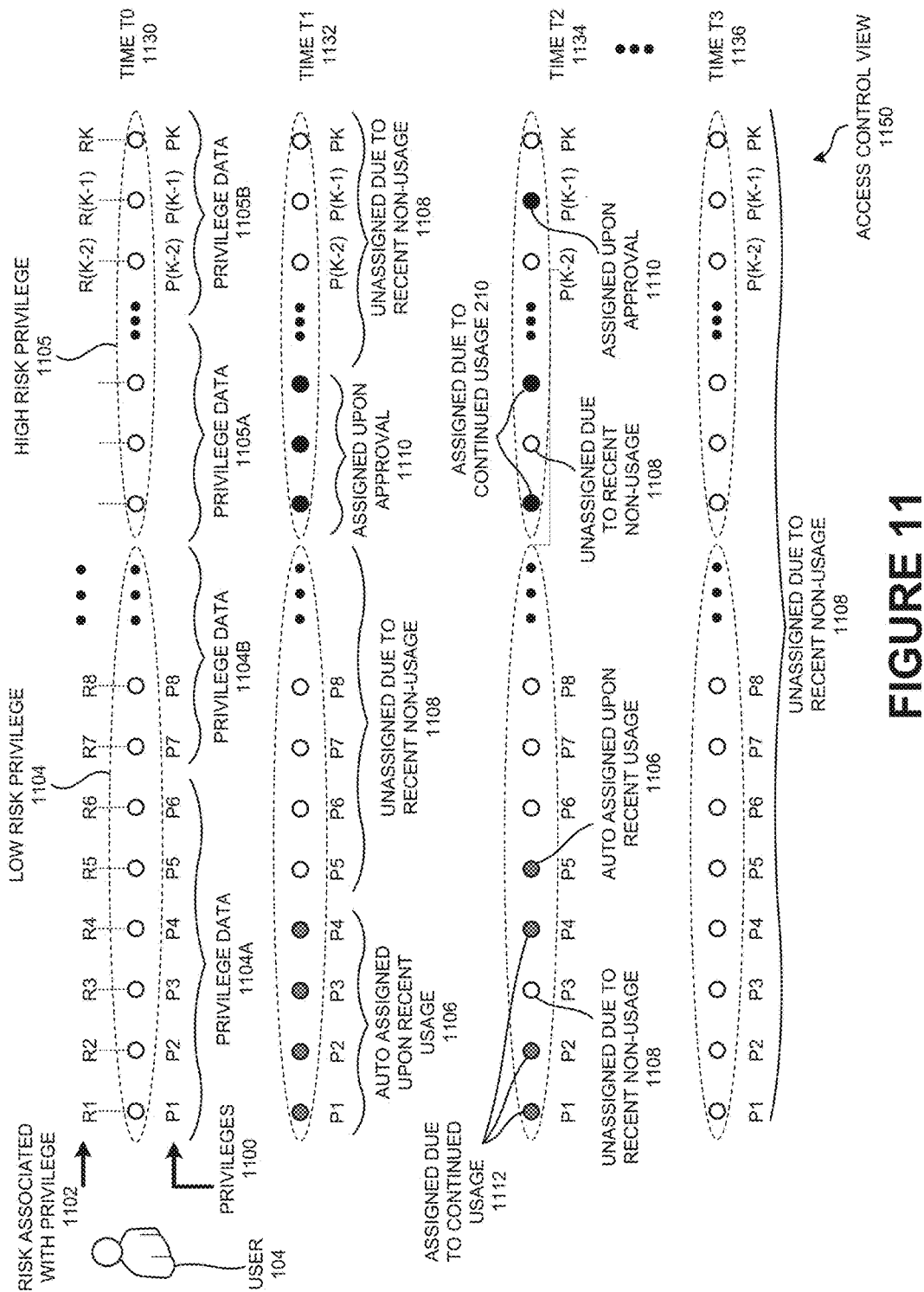
FIG. 11 is an access control view illustrating a user having privileges dynamically assigned (access granted) and unassigned (access denied) by the infrastructure security server of FIG. 1, according to one embodiment.

FIG. 11 is an access control view 1150 illustrating a user 104 having privileges dynamically assigned (e.g., access granted) and unassigned (e.g., access denied) (e.g., using dynamic privilege adjustment 712) by the infrastructure security server 100 of FIG. 1, according to one embodiment. Particularly, FIG. 11 builds on FIG. 1 through 10, and further adds, privileges 1100, a risk associated with privileges 1102, low risk privileges 1104, high risk privileges 1105, an "auto assigned upon recent usage" 1106, a "unassigned due to recent non-usage" 1108, an "assigned upon approval" 1110, an "assigned due to continued usage" 1112, a time T0 1130, a time T1 1132, a time T2 1134 and a time T3 1136, according to one embodiment.

In one embodiment, each user has access to a number of privileges 1100, including low risk privileges 1104 and high risk privileges 1105. Each privilege 1100 is associated with at least one risk value 1102. In the example shown in FIG. 11, there are K privileges 1100, namely P1 to PK. Privilege P1 is associated with a risk value 1102 of R1, privilege P2 is associated with a risk value of R2, and so on. The privileges 1100 may be numbered so that $R1<=R2<=R3<= \ldots <=R(K-2)<=R(K-1)<=R(K)$.

At time T0 1130 (initially), all the privileges 1100 may be available to user 104 but not assigned.

Some time later, at time T1 1132, after the user 104 has requested various privileges as he performs his tasks and roles, some privileges may have been assigned to the user 104. In the example in FIG. 11, some low risk privileges 1104 such as P1 to P4 have been assigned to the user 104 in an "auto assigned upon recent usage" 1106 manner due to recent usage of the privileges by the user 104. Some high risk privileges 1106 have been assigned in an "assigned upon approval" 1110 manner due to recent request of usage by user 104 and subsequent approval. The other low risk privileges 1104 and high risk privileges 1105 are unassigned in a "unassigned due to recent non-usage" 1108 manner due to non-usage (not being used) by the user 104, according to one embodiment.

Some time later, at time T2 1134, some of the previously assigned low risk privileges 1104 (e.g., P3) and high risk privileges 1105 (as shown in FIG. 11) have been revoked in a "unassigned due to recent non-usage" 1108 manner because they have not been used in the recent past. The other previously assigned low risk privileges 1104 (e.g., P1, P2 and P4) and high risk privileges 1105 (as shown in FIG. 11) remain assigned in an "assigned due to continued usage" 1112 manner because they have been used in the recent past. Some previously unassigned low risk privileges 1104 (e.g., P5) have been additionally assigned in an "auto assigned upon recent usage" 1106 manner as they have been recently used. Similar, some previously unassigned high risk privileges 1105 (e.g., P(K-1)) have been assigned in an "assigned upon approval" 1110 manner.

Some time later, at time T3 1136, the user 104 may have been on vacation for some time such that all the privileges have been unassigned (or revoked) in a "unassigned due to recent non-usage" manner, according to one embodiment.

Figure 12:
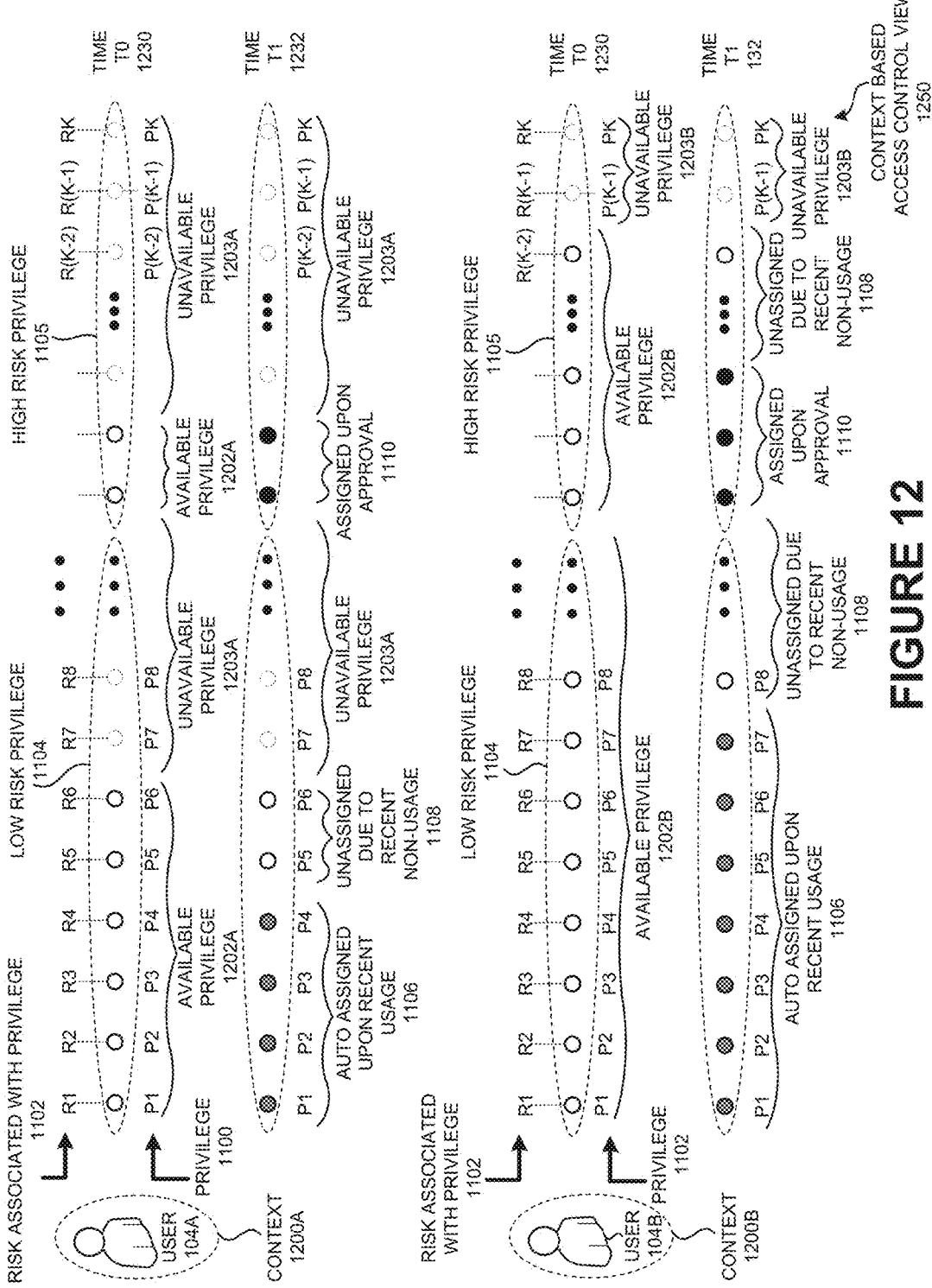
FIG. 12 is a context based access control view illustrating the impact of user context on the dynamic user privilege assignment and un-assignment (revocation) by infrastructure security server of FIG. 1, according to one embodiment.

FIG. 12 is a context based access control view 1250 illustrating the impact of user context (e.g., 1200A, 1200B) on the dynamic user privilege assignment (e.g., granting access of available privileges) and unassignment (e.g., denying access) by the infrastructure security server 100 (e.g., using dynamic privilege adjustment 712) of FIG. 1, according to one embodiment. Particularly, FIG. 12 builds on FIG. 1 through 11, and further adds, a context 1200A, a context 1200B, an available privilege 1202A, an available privileges 1202B, an unavailable privileges 1203A, an unavailable privileges 1203B, an unavailable privilege 1203B, a time T0 1230 and a time T1 1232.

FIG. 12 is an example embodiment illustrating the same user (104A and 104B) experiencing different availability of privileges under different contexts (1200A and 1200B). User 104A is user 104 under context 1200A (e.g., user 104 logging in using a mobile phone in a terrorist state at midnight—a context with high risk activities). User 104B is the same user 104 under context 1200B (e.g., user 104 logging in using his/her office computer at regular office hours—a context with low risk activities). As the infrastructure security server 100 monitors (e.g., using monitor module 202) the activities of the user 104, the contexts 1200A and 1200B are known to the infrastructure security server 100. Based on the different contexts, the infrastructure security server 100 makes different amount of privileges available (e.g., available privileges 1202A for context 1200A and available privileges 1202B for context 1200B) with the rest of the privileges 1100 unavailable (e.g., unavailable privileges 1203A for context 1200A and unavailable privileges 1203B for context 1200B). A context with higher risk (e.g., 1200A) may result in fewer low-risk privileges and fewer high risk privileges available than a context with lower risk (e.g., 1200B), according to one embodiment.

For the available privileges, the infrastructure security server 100 may assign (e.g., access granted) and/or unassign (e.g., access denied) them to the user 104 based on recent user usage and request/grant. Initially, at time T0 1230, the available privileges 1202A and 1202B are available but not assigned as the user (e.g., 104A and 104B) are not used/requested any privileges yet. Some time later, at time T1 1232, some low risk privileges 1104 among the group of available privileges are auto assigned upon recent usage 1106. Some high risk privileges 1105 among the group of available privileges are assigned upon approval 1110. Other privileges in the group of available privileges are not assigned due to recent non-usage 1108, according to one embodiment.

Figure 13:
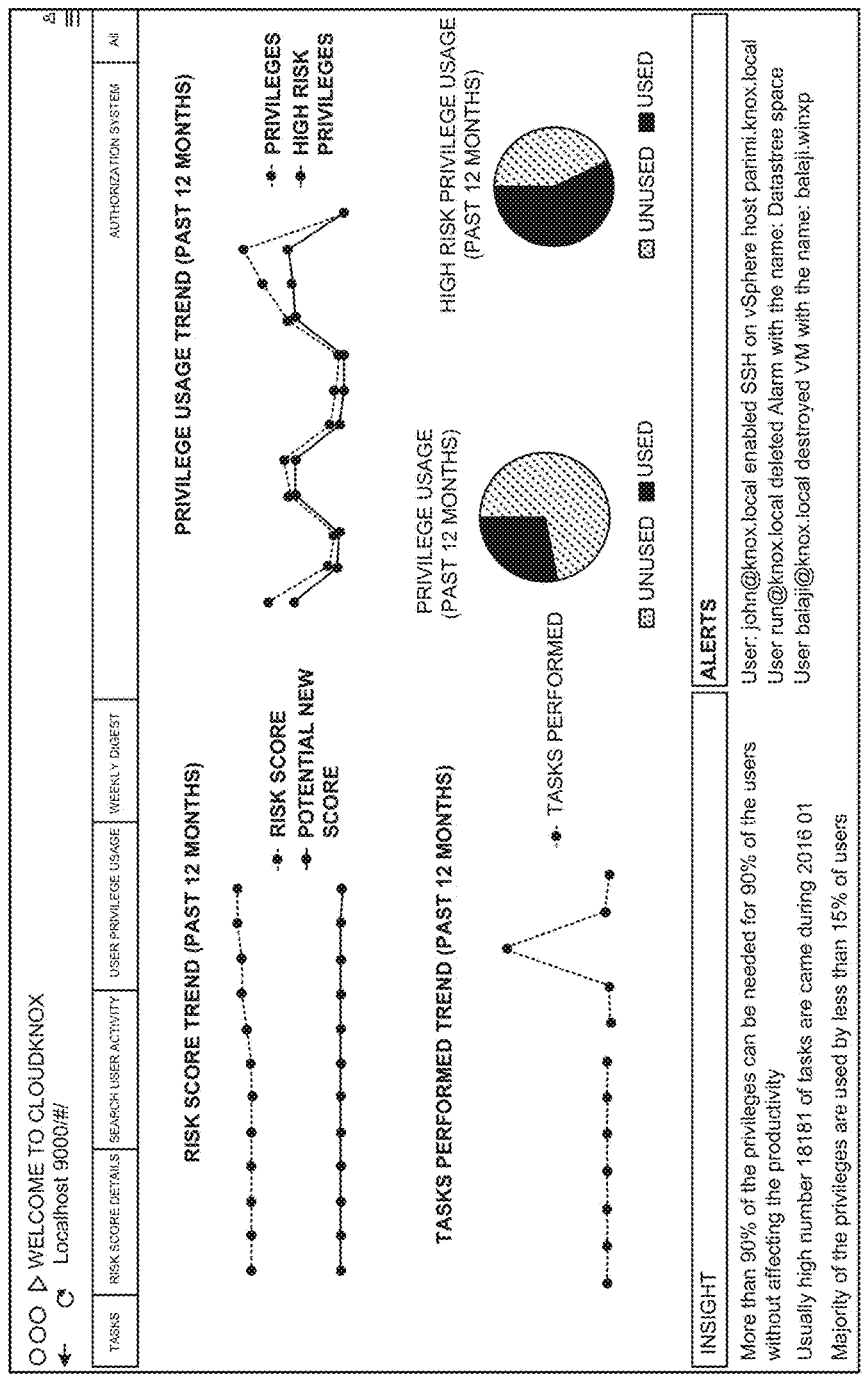
FIG. 13 is a user interface view illustrating graphical representation of the risk score trend, privilege usage trend, and task performed trend of an enterprise using infrastructure security server of FIG. 1, according to one embodiment.

FIG. 13 is a user interface view 1350 illustrating graphical representation of the risk score 210 trend, privilege usage trend (e.g., privilege usage patterns 1714), and task performed trend using the infrastructure security server 100 of FIG. 1, according to one embodiment.

The risk depiction infographics of the infrastructure security server 100 may enable system user 904 to keep track of the computed risk score 210 data for the user 104 every day, and plot it to show the past and present privilege (including high risk privileges 1105) usage. It provides insight from the risk analysis and alerts/warnings to the system user 904, according to one embodiment.

Figure 14:
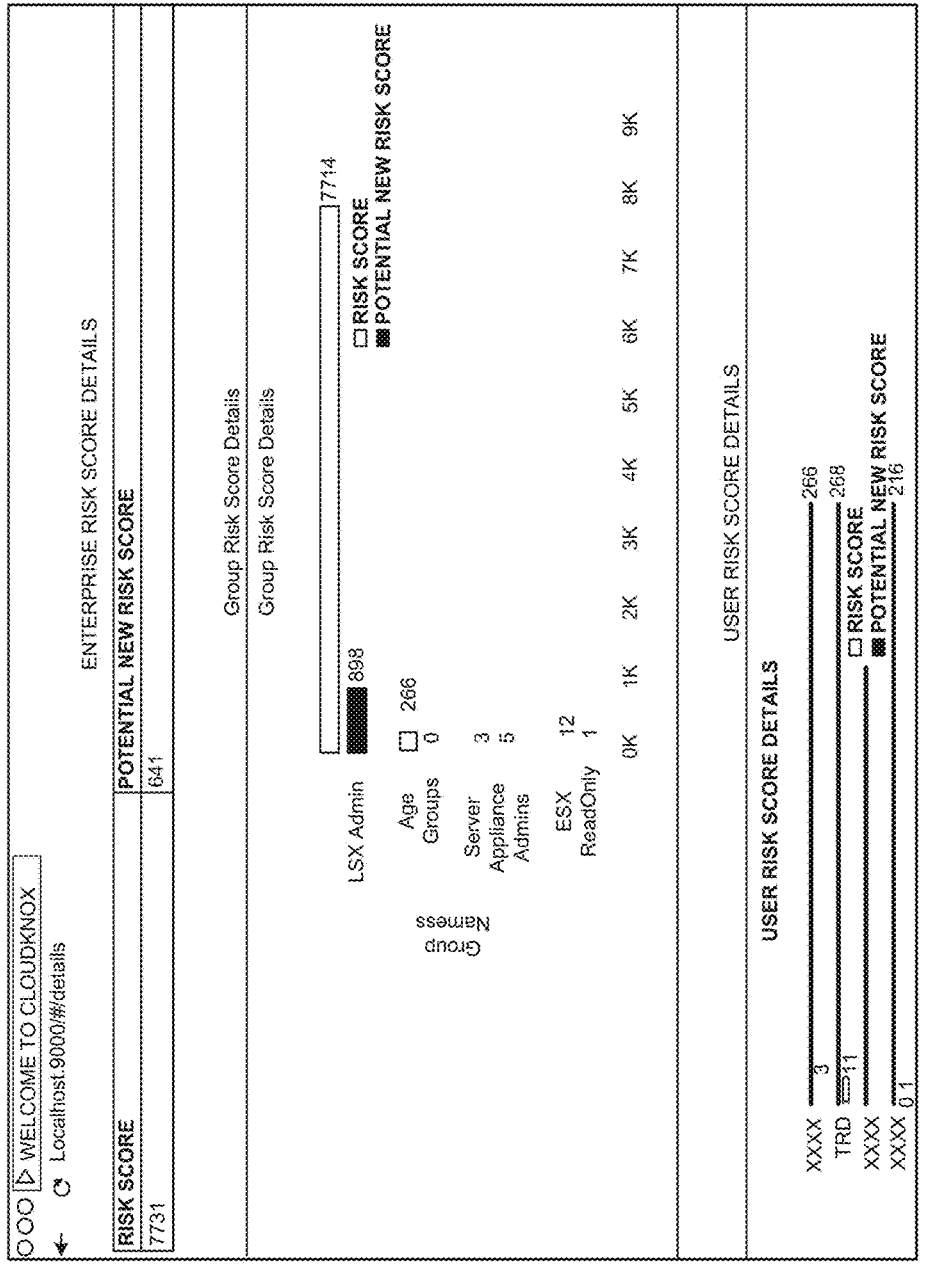
FIG. 14 is a user interface view illustrating an enterprise risk score details in graphical and tabular form of an enterprise using the infrastructure security server of FIG. 1, according to one embodiment.

FIG. 14 is a user interface view 1450 illustrating an enterprise risk score 210 details in graphical and/or tabular form of the infrastructure security server 100 of FIG. 1, according to one embodiment.

In the example embodiment, the user level analytics may be used for assessing the risk 1102 for each user as depicted in the enterprise risk score 210 details in graphical and/or tabular form. The user privileges 1710 dictate what the user 104 is capable of doing. The higher the user privileges 1710, the higher the risk score 210. The infrastructure security server 100 may compute and analyze the risk score 210 for each user 104, simulating various scenarios when various unused and/or lowly used privileges are removed, and/or plot the results including the overall risk score 210 for all users 104. It shows both the current risk score 210 and a potential new risk score 210 that can be significantly lower than the current risk score 210 if some unused and/or low usage privileges are removed.

Figure 15:
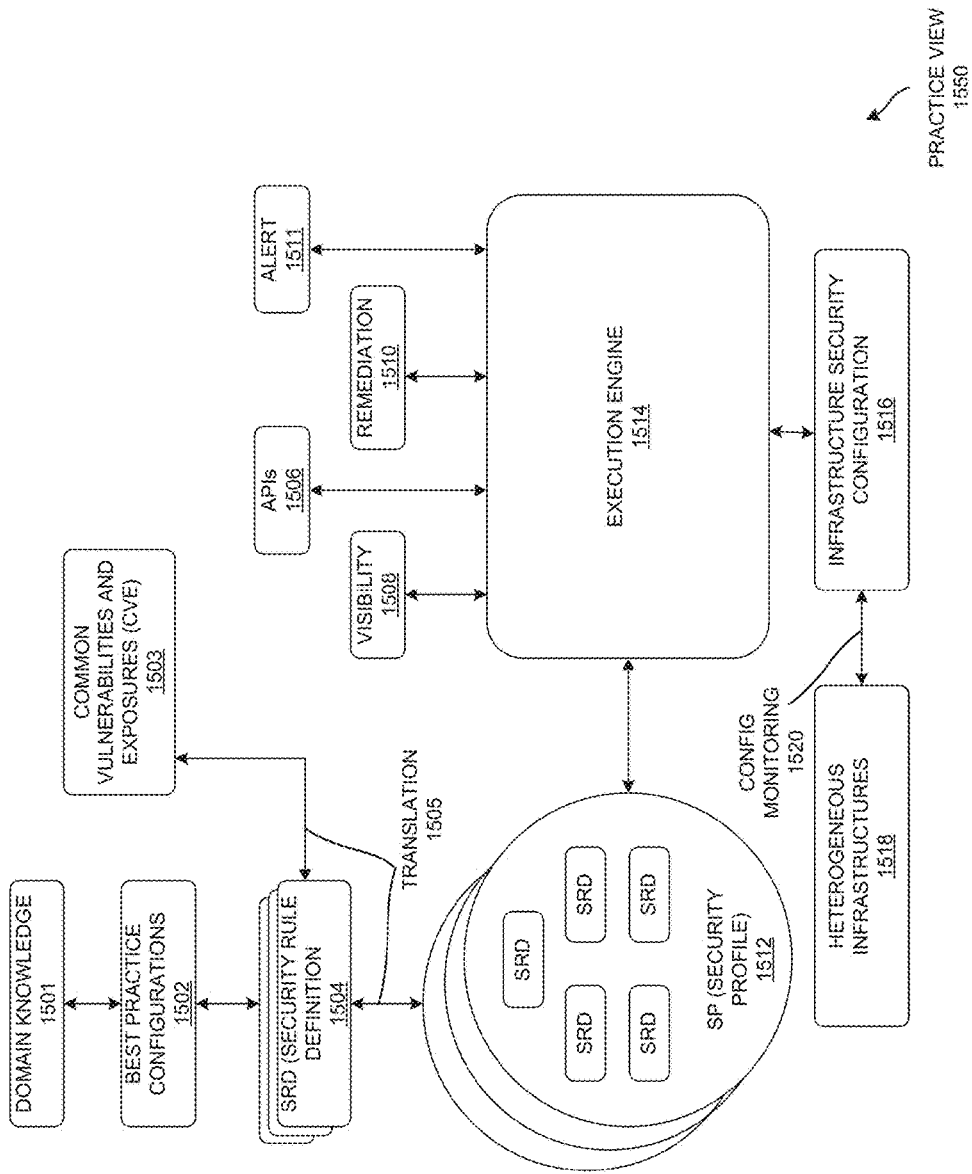
FIG. 15 is a best practice view illustrating best practices are translated into security rule definition to form security profiles that can be executed and analyzed with an execution engine, according to one embodiment.

FIG. 15 is a best practice view 1550 illustrating best practices 1502 are translated (using translation 1505) into security rule definition (SRD) 1504 to form security profiles (SD) 1512 that can be executed and analyzed with an execution engine 1514, according to one embodiment. Particularly, FIG. 15 builds on FIG. 1 through 14, and further adds, a domain knowledge 1501, best practices 1502, common vulnerabilities and exposures (CVE) 1503, a SRD (security rule definition) 1504, a translation 1505, an API (application program interface) 1506, a visibility 1508, a remediation 1510, an alert 1511, a SP (security profile) 1512, an execution engine 1514, an infrastructure security configuration 1516, heterogeneous infrastructures 1518, and a config monitoring 1520.

In one embodiment, there may be some known best practices 1502 related to domain knowledge 1501 in the configurations of infrastructure security server 100. The best practices 1502 may be gained from experience by some system user 904 who has extensive, insightful domain knowledge 1501. The best practices 1502 may be from vendors, service/equipment/system providers, and/or may be published/shared by other users. A set of common vulnerabilities and exposures (CVE) 1503 may also be known. The best practices 1502 and/or the common vulnerabilities and exposures (CVE) 1503 are translated into programmatic execution. The best practices 1502 and/or the common vulnerabilities and exposures (CVE) 1503 are translated into a set of SRD (security rule definitions) 1504. The SRD 1504 are grouped into a set of SP (security profile) 1512. Each SP 1512 may have a number of SRD 1504. The SP 1512 and/or the SRD 1504 are implemented and/or executed using an execution engine 1514.

In particular, the execution engine 1514 may have access to a set of infrastructure security configurations 1516 associated with some heterogeneous infrastructures 1518, obtained by using config monitoring 1520 the heterogeneous infrastructures 1518. The execution engine 1514 may analyze the infrastructure security configurations 1516 associated with the heterogeneous infrastructures 1518 based on the security rule definitions (SRD) 1504 and security profiles (SP) 1512 (i.e. the translated best practice configurations 1502 and/or the translated common vulnerabilities and exposures (CVE) 1503), according to one embodiment.

The execution engine 1514 may have an API (application program interface) 1506, a visibility 1508, a remediation 1510 and an alert 1511. The API 1506 may allow the execution engine 1514 to interface with other applications and/or services. The API 1506 may enable the execution engine 1514 to obtain the infrastructure security configuration 1516 of the heterogeneous infrastructures 1518 obtained by config monitoring 1520. When any discrepancy of the infrastructure security configurations 1516 from the best practice configurations 1502 and/or any translated CVE 1503 in the infrastructure security configurations 1516 are detected, the execution engine 1514 may alert (e.g., using alert 1511) a set of devices and a user and may display the security information using the visibility 1508. The visibility 1508 may also allow the SRD 1504, the SP 1512 and/or the infrastructure security configuration 1516 be visualized and visually analyzed. The execution engine 1514 may analyze the infrastructure security configuration 1516 and suggest some possible modifications to the infrastructure security configuration 1516 to solve the problem. The remediation 1510 may provide possible modifications and/or recommendation to infrastructure security configuration 1516 to avoid violating the security rule definitions 1504 and the security profiles 1512 (so as to conform with best practice configurations 1502 and avoid common vulnerabilities and exposures (CVE) 1503, according to one embodiment.

Figure 16:
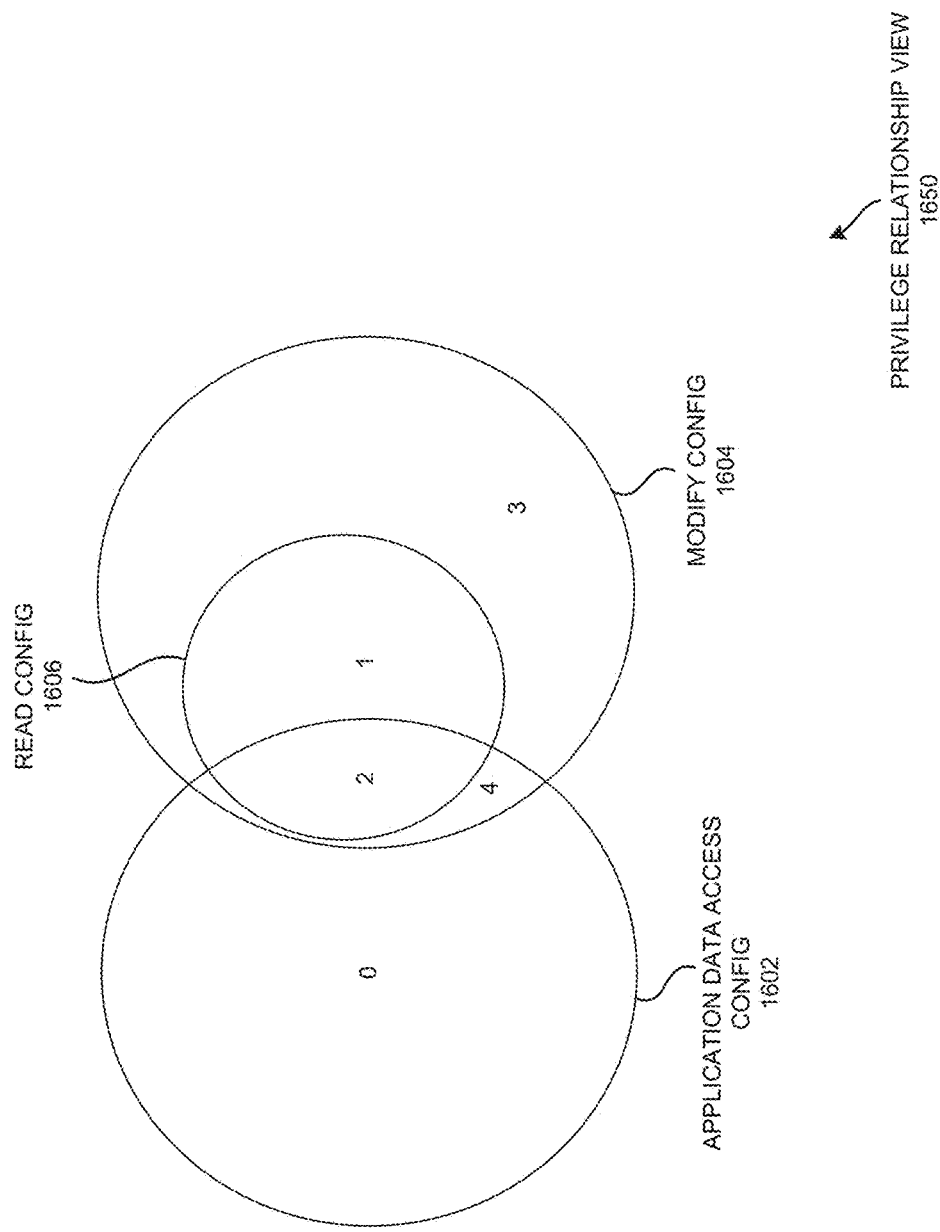
FIG. 16 is a privilege relationship view illustrating intersection relationship and subset relationships among privileges associated with different operations, according to one embodiment.

FIG. 16 is a privilege relationship view 1650 illustrating intersection relationship and subset relationship among privileges associated with different operations, according to one embodiment. Particularly, FIG. 16 builds on FIG. 1 through 15, and further adds, an application data access config 1602, a modify config 1604 (a configuration for a "modify" operation) and a read config 1606 (a configuration for a "read" operation).

In the embodiment, some privileges in regions 1, 2, 3 and 4 are associated with the "modify" operation in the modify config 1604. Some privileges in regions 1 and 2 are associated with the "read" operation in the read config 1606. As the "modify" operation needs the "read" operation, the privilege set (portions 1 and 2) associated with the "read" operation in the read config 1606 is a subset of the privilege set (portions 1, 2, 3 and 4) associated with the "modify" operation in the modify config 1604. Other operations may have privilege sets intersection partially with the privilege sets associated with "read" and "modify". For example, the "access application data" operation may perform "read" operation and "modify" operation on only some of the data, namely, only the application data but not the system data. Thus the privilege set (portions 0, 2 and 4) associated with the "access application data" operation in application data access config 1602 intersects partially with the privilege set (portions 1, 2, 3 and 4) of the modify config 1604, with portions 2 and 4 being in the intersection. Similarly, the privilege set (portions 0, 2 and 4) associated with the "access application data" operation in application data access config 1602 intersects partially with the privilege set (regions 1 and 2) of the read config 1606, with portion 2 being in the intersection. The application data access config 1602 may have some privileges (e.g., related to application operations) unrelated to "read" and "modify" and thus portion 0 of the application data access config 1602 is outside the modify config 1604. Similarly, portions 0 and 4 of the application data access config 1602 is outside the read config 1606.

Figure 17:
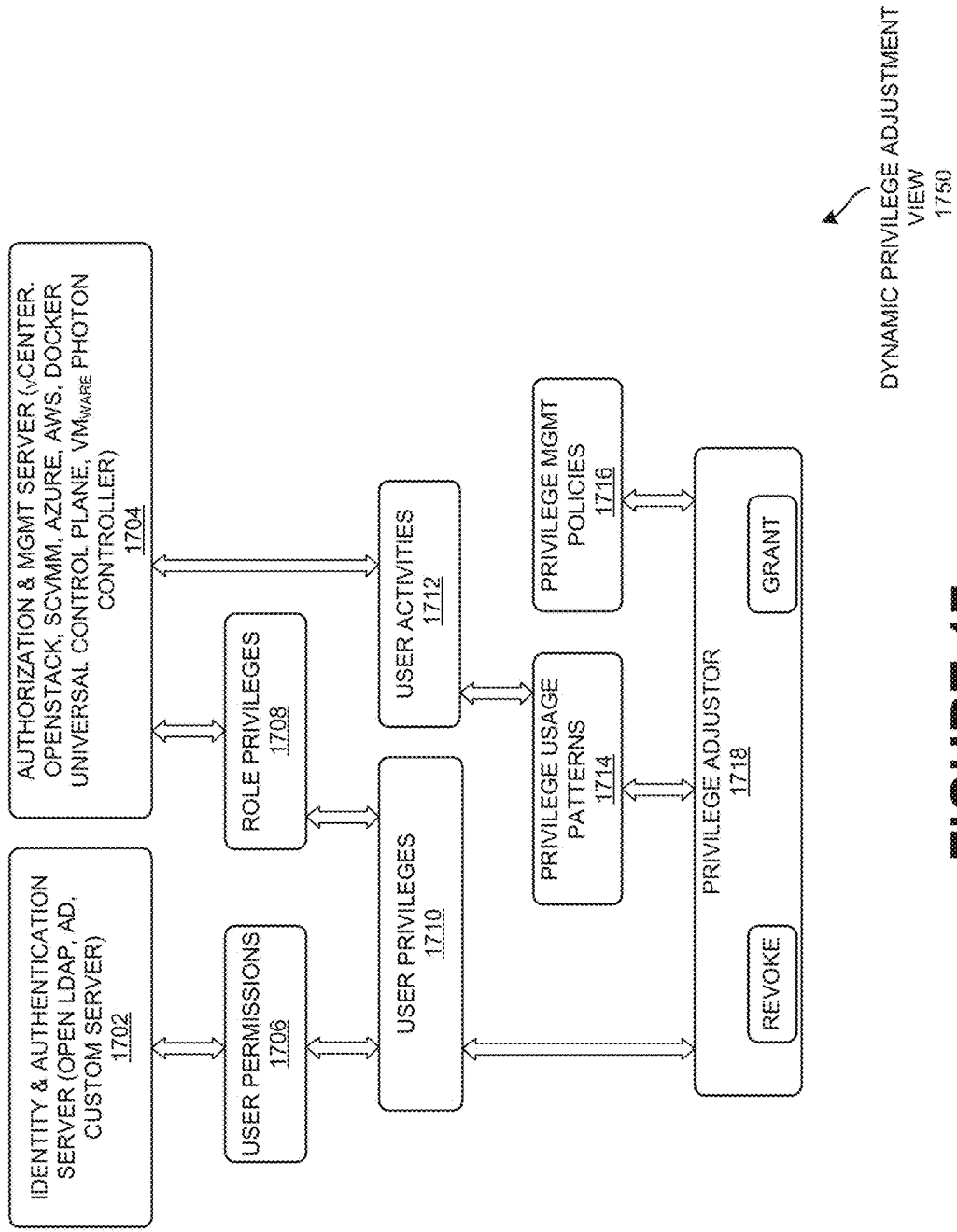
FIG. 17 is a dynamic privilege adjustment view illustrating the infrastructure security server monitoring user activity and adjusting user privilege dynamically, according to one embodiment.

FIG. 17 is a dynamic privilege adjustment view 1750 illustrating the infrastructure security server 100 monitoring (e.g., using monitor module 202) user activities 1712 and adjusting user privilege 1710 dynamically (e.g., using dynamic privilege adjustment 712), according to one embodiment. Particularly, FIG. 17 builds on FIG. 1 through 16, and further adds an identity and authentication server 1702, an authorization and management server 1704, user permissions 1706, role privileges 1708, user privileges 1710, user activities 1712, privilege usage patterns 1714, privilege management policies 1716 and a privilege adjustor 1718, according to one embodiment.

In the embodiment, when a user 104 logs into a target server with access to the authorization and management server 1704 (e.g., using login name and password), the authentication of the user account is performed by the identity and authentication server 1702 which communicates the user account information including a list of user roles with associated user permissions 1706 to the authorization and management server 1704. The target server may be the authorization and management server 1704. With the user account information and the list of user permissions 1706, the authorization and management server 1704 knows that the user 104 is entitled to a set of role privileges 1708 which in turn is associated with a set of user privileges 1710. The infrastructure security server 100 functions as the privilege adjustor 1718 supporting the revoke and grant of privileges to user 104. The infrastructure security server 100 monitors (e.g., using monitor module 202) the user activities 1712, analyzes the privilege usage patterns 1714 and applys a set of privilege management policies (e.g., SP (security profiles) 1512 with corresponding SRD (security rule definition) 1504) to dynamically adjust (e.g., using dynamic privilege adjustment 712) the user privileges 1710. The infrastructure security server 100 checks to see if a unique role is defined for the user 104 (i.e. each user should have a unique role).

Figure 18:
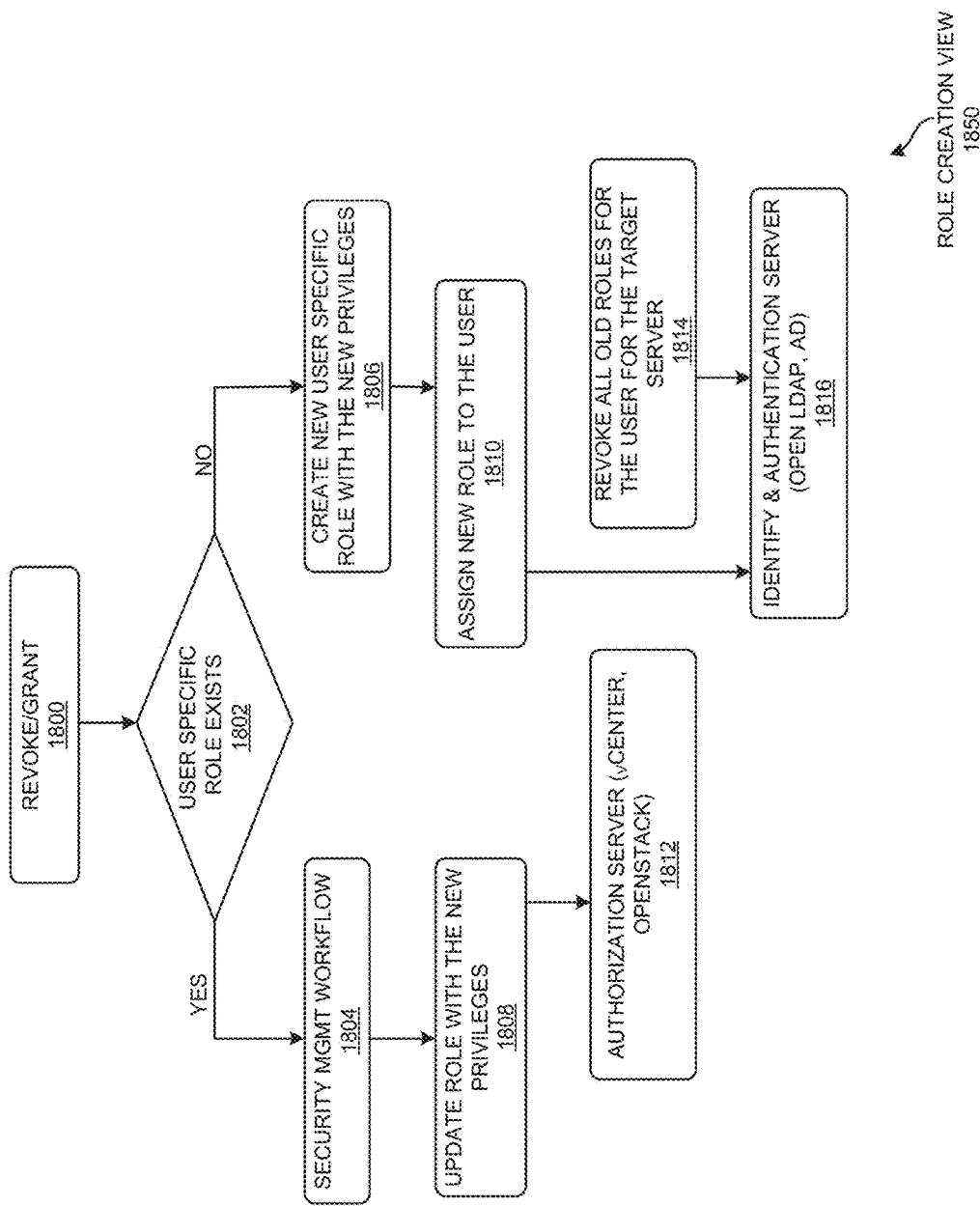
FIG. 18 is a user role creation view illustrating user role privilege update if user role exists and new user role creation if not, according to one embodiment.

FIG. 18 is a user role creation view 1850 illustrating user role privilege update if user role exists and new user role creation if not, according to one embodiment. Particularly, FIG. 18 builds on FIG. 1 through 17, and further adds a revoke/grant 1800 of privileges, a "user specific role exist" 1802, a security management workflow 1804, a "create new user specific role with the new privileges" 1806, an "update role with the new privilege" 1808, an "assign new role to the user" 1810, an authorization server 1812, a "revoke all old roles for the user for the target server" 1814 and an identity and authentication server 1816.

In the embodiment, the infrastructure security server 100 functioning as the privilege adjustor 1718 checks if "user specific role exists" 1802. If "yes" (i.e. the user specific role exists), it goes through the security management workflow 1804. The security management workflow 1804 includes receiving a low risk privilege 1104 request 1104 from user 104 and applying privilege management policies 1716 (e.g., security rule definition 1504 and/or security profile 1512) to auto-approve/grant the privilege and notifying the system user 904. The workflow also includes receiving a high risk privilege 1105 request from user 104, applying privilege management policies 1716, computing the risk score 210, notifying the system user 904, waiting for the system user's 904 decision, and granting and/or denying the privilege depending on the system user's response. The workflow may also include monitoring (e.g., using monitor module 202) user activities 1712 and applying privilege management policies 1716 (e.g., security rule definition 1504 and/or security profile 1512) to revoke privileges to reduce risk 1102 (e.g., privileges not recently used may be revoked, and/or privileges not frequently used in the recent past may be revoked, etc). The user specific role is updated with the new privileges 1808 and the authorization server 1704 is notified in 1812, according to one embodiment.

If it is a "no" in 1802 (i.e. the user specific role does not exist), a new user specific role is created with the new privileges in 1806 and the authorization server 1704 is notified in 1812. The new user specific role is assigned to the user in 1810 and the identify and authentication server 1702 is notified in 1816. The identity and authentication server 1702 may revoke all old roles for the user for the target server.

One embodiment is a method and system of assigning and/or managing privileges dynamically (e.g., using dynamic privilege adjustment 712) based on user activities 1712 using policy-based automation 606.

Another embodiment is a method of translating knowledge of best practices 1502 to programmable logic for automation. Knowledge of best practices 1502 (e.g., from manual from vendors and/or from some information sharing platforms) are translated into configurations to programmatic execution. In particular, best practices 1502 are translated into at least Security Profile 1512 and Security Rules Definition 1504.

One embodiment is a multi-dimensional risk score (RS) 210 calculation across heterogeneous modern infrastructure. For example, RS 210 may be computed, analyzed and interpreted from at least three dimensions: (1) User privileges 1710/User activity 1712, (2) User Context (e.g., 1200A, 1200B) and/or behavior, (3) Infrastructure configuration (e.g. application data access config 1602, modify config 1604, read config 1606).

One embodiment is a method, system and apparatus to dynamically assess the required authentication, based on the risk exposure 1102. One embodiment is to a method, system and apparatus to compute and/or assign risk score 210 for the plug-ins 902. One embodiment is a Policy Based Privilege Automation (e.g., using policy based automation 606). One embodiment is Context (e.g., 1200A, 1200B) and Behavior based access rights/privileges.

A number of embodiments have been described. Nevertheless, it will be understood that various modifications may be made without departing from the spirit and/or scope of the claimed invention. In addition, the logic flows depicted in the Figures do not require the particular order shown, and/or sequential order, to achieve desirable results. In addition, other steps may be provided, and/or steps may be eliminated, from the described flows, and/or other components may be added to, and/or removed from, the described systems. Accordingly, other embodiments are within the scope of the following claims.

It may be appreciated that the various systems, methods, and/or apparatus disclosed herein may be embodied in a machine-readable medium and/or a machine accessible medium compatible with a data processing system (e.g., a computer system), and/or may be performed in any order.

The structures and/or modules in the Figures may be shown as distinct and/or communicating with only a few specific structures and not others. The structures may be merged with each other, may perform overlapping functions, and/or may communicate with other structures not shown to be connected in the Figures. Accordingly, the specification and/or drawings may be regarded in an illustrative rather than a restrictive sense.

We claim:

1. A method of an infrastructure security server communicatively coupled with a set of heterogeneous infrastructures, comprising:
    translating at least one of a set of security best practice configurations of the heterogeneous infrastructures and a set of common vulnerabilities and exposures (CVE) of the heterogeneous infrastructures to programmatic execution;
    monitoring infrastructure security configurations associated with the heterogeneous infrastructures using a processor and a memory of the infrastructure security server;
    analyzing the infrastructure security configurations associated with the heterogeneous infrastructures based on at least one of the translated security best practice configurations and the translated common vulnerabilities and exposures (CVE);
    detecting at least one of:
        any discrepancy of the infrastructure security configurations from the translated security best practice configurations, and
        any translated CVE in the infrastructure security configurations; and
    alerting to a set of devices and a user through at least one communication channel about any discrepancy of the infrastructure security configurations from the translated security best practice configurations and any translated CVE in the infrastructure security configurations.

2. The method of the infrastructure security server in claim 1, further comprising:
    translating at least one of the security best practice configurations of the heterogeneous infrastructures and the set of common vulnerabilities and exposures (CVE) of the heterogeneous infrastructures to a set of security rule definitions; and
    constructing a set of security profiles each comprising a subset of the set of the security rule definitions.

3. The method of the infrastructure security server in claim 2, further comprising:
    sharing the security rule definitions and the security profiles to be used by heterogeneous authorization systems and heterogeneous cloud-based services using a platform comprising at least one of a social network, a networked forum, a networked bulletin board, a networked chat room, a networked news group, and other communications channels.

4. The method of the infrastructure security server in claim 2:
    wherein the platform providing at least one application program interface (API) for third parties to develop the security rule definitions and the security profiles.

5. The method of the infrastructure security server in claim 2, further comprising:
    obtaining other shared security rule definitions and other shared security profiles from third parties using the platform comprising at least one of a social network, a networked forum, a networked bulletin board, a networked chat room, a networked news group, and other communications channels,
    wherein the other shared security rule definitions and the other shared security profiles are to be used by heterogeneous authorization systems and heterogeneous cloud-based services.

6. The method of the infrastructure security server in claim 2, further comprising:
    analyzing the infrastructure security configurations associated with the heterogeneous infrastructures based on the security rule definitions and the security profiles;
    detecting if the infrastructure security configurations violate any of the security rule definitions and the security profiles;
    alerting to the set of devices and the user through the at least one communication channel if the infrastructure security configurations violate any of the security rule definitions and the security profiles; and
    suggesting modifications of the infrastructure security configurations associated with the heterogeneous infrastructures to avoid violating any of the security rule definitions and the security profiles,
        wherein the modifications of the infrastructure security configurations is at least one of a manual, a semi-automatic, and a fully automatic.

7. A system comprising:
    an infrastructure security server communicatively coupled with a set of heterogeneous infrastructures:
        to translate at least one of a set of security best practice configurations of the heterogeneous infrastructures and a set of common vulnerabilities and exposures (CVE) of the heterogeneous infrastructures to programmatic execution;
        to monitor infrastructure security configurations associated with the heterogeneous infrastructures using a processor and a memory of the infrastructure security server;
        to analyze the infrastructure security configurations associated with the heterogeneous infrastructures based on at least one of the translated security best practice configurations and the translated common vulnerabilities and exposures (CVE);
        to detect at least one of:
            a discrepancy of the infrastructure security configurations from the translated security best practice configurations, and
            the translated CVE in the infrastructure security configurations;
        to alert a set of devices and a user through at least one communication channel about any discrepancy of the infrastructure security configurations from the translated security best practice configurations and any translated CVE in the infrastructure security configurations; and
        to suggest modifications of the infrastructure security configurations associated with the heterogeneous infrastructures as a remediation for the discrepancy and the CVE,
            wherein the modifications of the infrastructure security configurations is at least one of a manual, a semi automatic, and a fully automatic.

8. The system of claim 7, wherein the infrastructure security server:
    to translate at least one of the security best practice configurations of the heterogeneous infrastructures and the set of common vulnerabilities and exposures (CVE) of the heterogeneous infrastructures to a set of security rule definitions; and to construct a set of security profiles each comprising a subset of the set of the security rule definitions.

9. The system of claim 7, wherein the infrastructure security server:
to share the security rule definitions and the security profiles to be used by heterogeneous authorization systems and heterogeneous cloud-based services using a platform comprising at least one of a social network, a networked forum, a networked bulletin board, a networked chat room, a networked news group, and other communications channels.

10. The system of claim 7, wherein the infrastructure security server:
to provide at least one application program interface (API) for third parties to develop the security rule definitions and the security profiles.

11. The system of claim 7, wherein the infrastructure security server:
to obtain other shared security rule definitions and other shared security profiles from third parties using the platform comprising at least one of a social network, a networked forum, a networked bulletin board, a networked chat room, a networked news group, and other communications channels,
wherein the other shared security rule definitions and the other shared security profiles are to be used by heterogeneous authorization systems and heterogeneous cloud-based services.

12. The system of claim 7, further comprising:
a security best practices automation engine:
to identify security best practices for the set of heterogeneous infrastructures, and
to create security rule definitions m the infrastructure for each of the translated security best practice configurations and the translated common vulnerabilities and exposures (CVE),
wherein the security rule definitions to include a rule, a violation triggering condition, and a remediation action.

13. The system of claim 12, wherein the security best practices automation engine to automatically execute the security rule definitions specified in each of the active security profiles.

14. The system of claim 12, wherein the remediation action to include at least one of the following:
automatically fix the violation,
notify the infrastructure security server,
set a timer for automatic fix to start from the point of violation trigger,
send a notification to the infrastructure security server about the violation,
provide a way to schedule automatic fix for the violation,
send a notification to the infrastructure security server about the violation,
provide a link to the user to fix it, and
provide ways to fix the violation at least one of a manually and a semi-automatically.

15. An apparatus comprising:
an infrastructure security server; and
a set of heterogeneous infrastructures communicatively coupled with the infrastructure security server to:
translate at least one of a set of security best practice configurations of the heterogeneous infrastructures and a set of common vulnerabilities and exposures (CVE) of the heterogeneous infrastructures to programmatic execution;
monitor infrastructure security configurations associated with the heterogeneous infrastructures using a processor and a memory of the infrastructure security server;
analyze the infrastructure security configurations associated with the heterogeneous infrastructures based on at least one of the translated security best practice configurations and the translated common vulnerabilities and exposures (CVE);
detect at least one of:
a discrepancy of the infrastructure security configurations from the translated security best practice configurations, and the translated CVE in the infrastructure security configurations;
alert a set of devices and a user through at least one communication channel about any discrepancy of the infrastructure security configurations from the translated security best practice configurations and any translated CVE in the infrastructure security configurations; and
suggest modifications of the infrastructure security configurations associated with the heterogeneous infrastructures as a remediation for the discrepancy and the CVE,
wherein the modifications of the infrastructure security configurations is at least one of a manual, a semi-automatic, and a fully automatic.

16. The apparatus of claim 15, wherein the set of heterogeneous infrastructures communicatively coupled with the infrastructure security server to further:
translate at least one of the security best practice configurations of the heterogeneous infrastructures and the set of common vulnerabilities and exposures (CVE) of the heterogeneous infrastructures to a set of security rule definitions; and
construct a set of security profiles each comprising a subset of the set of the security rule definitions.

17. The apparatus of claim 15, wherein the set of heterogeneous infrastructures communicatively coupled with the infrastructure security server to further:
share the security rule definitions and the security profiles to be used by heterogeneous authorization systems and heterogeneous cloud-based services using a platform comprising at least one of a social network, a networked forum, a networked bulletin board, a networked chat room, a networked news group, and other communications channels.

18. The apparatus of claim 15, wherein the set of heterogeneous infrastructures communicatively coupled with the infrastructure security server to further:
obtain other shared security rule definitions and other shared security profiles from third parties using the platform comprising at least one of a social network, a networked forum, a networked bulletin board, a networked chat room, a networked news group, and other communications channels,
wherein the other shared security rule definitions and the other shared security profiles are to be used by heterogeneous authorization systems and heterogeneous cloud-based services.

19. The apparatus of claim 15, wherein the set of heterogeneous infrastructures communicatively coupled with the infrastructure security server to further:
analyze the infrastructure security configurations associated with the heterogeneous infrastructures based on the security rule definitions and the security profiles;

detect if the infrastructure security configurations violate any of the security rule definitions and the security profiles;

alert the set of devices and the user through the at least one communication channel if the infrastructure security configurations violate any of the security rule definitions and the security profiles; and suggest modifications of the infrastructure security configurations associated with the heterogeneous infrastructures to avoid violating any of the security rule definitions and the security profiles, wherein the modifications of the infrastructure security configurations is at least one of a manual, a semi-automatic, and a fully automatic.

20. The apparatus of claim 15, further comprising:

a security best practices automation engine:
    to identify security best practices for the set of heterogeneous infrastructures, and
    to create security rule definitions m the infrastructure for each of the translated security best practice configurations and the translated common vulnerabilities and exposures (CVE),
        wherein the security rule definitions to include a rule, a violation triggering condition, and a remediation action.

21. A method of an infrastructure security server communicatively coupled with a set of heterogeneous infrastructures, comprising:

translating at least one of a set of security best practice configurations of the heterogeneous infrastructures and a set of common vulnerabilities and exposures (CVE) of the heterogeneous infrastructures to programmatic execution;

monitoring infrastructure security configurations associated with the heterogeneous infrastructures using a processor and a memory of the infrastructure security server;

analyzing the infrastructure security configurations associated with the heterogeneous infrastructures based on at least one of the translated security best practice configurations and the translated common vulnerabilities and exposures (CVE);

detecting at least one of:
    any discrepancy of the infrastructure security configurations from the translated security best practice configurations, and
    any translated CVE in the infrastructure security configurations; and suggesting modifications of the infrastructure security configurations associated with the heterogeneous infrastructures as a remediation for the discrepancy and the CVE,
    wherein the modifications of the infrastructure security configurations is at least one of a manual, a semi-automatic, and a fully automatic.

22. The method of the infrastructure security server in claim 21, further comprising:

translating at least one of the security best practice configurations of the heterogeneous infrastructures and the set of common vulnerabilities and exposures (CVE) of the heterogeneous infrastructures to a set of security rule definitions; and constructing a set of security profiles each comprising a subset of the set of the security rule definitions.

23. The method of the infrastructure security server in claim 22, further comprising:

sharing the security rule definitions and the security profiles to be used by heterogeneous authorization systems and heterogeneous cloud-based services using a platform comprising at least one of a social network, a networked forum, a networked bulletin board, a networked chat room, a networked news group, and other communications channels.

* * * * *